(12) United States Patent
Yim et al.

(10) Patent No.: US 6,530,784 B1
(45) Date of Patent: Mar. 11, 2003

(54) DISPLAY CONNECTION STRUCTURE OF ELECTRONIC APPLIANCE

(75) Inventors: Hong-kyun Yim, Suwon (KR); Heui-jong Kang, Yongin (KR); Jong-kuk Mun, Suwon (KR); Jin-hwan Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/662,354

(22) Filed: Sep. 14, 2000

(30) Foreign Application Priority Data

Sep. 14, 1999 (KR) .................................... 99-39329

(51) Int. Cl.⁷ .............................................. H01R 39/00
(52) U.S. Cl. ...................................... 439/31; 361/681
(58) Field of Search ........................... 439/31; 361/683, 361/681, 686; 359/154

(56) References Cited

U.S. PATENT DOCUMENTS

| | | | | |
|---|---|---|---|---|
| 4,749,364 A | * | 6/1988 | Arney et al. ............... | 361/681 |
| 4,926,365 A | | 5/1990 | Hsieh ........................ | 361/683 |
| 5,077,551 A | * | 12/1991 | Saitou ....................... | 361/681 |
| 5,138,565 A | | 8/1992 | Satou ........................ | 361/681 |
| 5,200,883 A | * | 4/1993 | Kobayashi ................. | 361/683 |
| 5,253,139 A | | 10/1993 | Satou ........................ | 361/681 |
| 5,262,759 A | | 11/1993 | Moriconi et al. .......... | 361/681 |
| 5,347,630 A | | 9/1994 | Ishizawa et al. ........... | 345/538 |
| 5,552,958 A | * | 9/1996 | Seto et al. .................. | 361/683 |
| 5,724,704 A | * | 3/1998 | Seo ............................ | 16/254 |
| 5,796,576 A | | 8/1998 | Kim .......................... | 361/681 |
| 5,805,415 A | * | 9/1998 | Tran et al. .................. | 361/681 |
| 5,949,565 A | * | 9/1999 | Ishida ........................ | 359/154 |
| 6,246,573 B1 | * | 6/2001 | Khan et al. ................. | 361/683 |
| 6,256,836 B1 | * | 7/2001 | Lin et al. ................... | 16/263 |
| 6,359,776 B2 | * | 3/2002 | Carlson ..................... | 361/683 |

* cited by examiner

*Primary Examiner*—Lynn Field
*Assistant Examiner*—Hae Moon Hyeon
(74) *Attorney, Agent, or Firm*—Robert E. Bushnell, Esq.

(57) ABSTRACT

A display connection structure of an electronic appliance is disclosed. The display connection structure includes a main body; a display for receiving an image signal from the main body and displaying an image; a connection unit including hinge pins rotatably installed at the main body, and housing provided at the display so as to be connected to the hinge pins and to pivot together with the hinge pins for detachably connecting the display to the main body; and an optical connector having portions provided at the main body and the display to correspond to each other for transmitting an image signal by light.

38 Claims, 16 Drawing Sheets

DISPLAY CONNECTION STRUCTURE OF ELECTRONIC APPLIANCE

CLAIM OF PRIORITY

This application makes reference to, incorporates the same herein, and claims all benefits accruing under 35 U.S.C. §119 from an application entitled Display Combining Structure for an Electronic Product earlier filed in the Korean Industrial Property Office on Sep. 14, 1999, and there duly assigned Ser. No. 99-39329 by that Office.

BACKGROUND OF THE INVENTION

1. Field of the Invention

The present invention relates to a display connection structure of an electronic appliance having a display, and more particularly, to a display connection structure of an electronic appliance having a display that is adapted to be detachable from a main body.

2. Description of the Related Art

In general, in a portable electronic appliance having a display, such as a notebook computer, a web video-phone, and a digital video camera, the main body of the electronic appliance and a display are integrally assembled.

Considering the example of a notebook computer as an example of an electronic appliance having a conventional display, the notebook computer has a main body having the electronics for controlling the portable computer system, and a display for displaying images in accordance with a control signal generated by the main body.

Input devices such as a keyboard and a mouse capable of inputting operational instructions, peripheral devices such as a hard disk drive, Compact Disc-Read Only Memory (CD-ROM) drive, modem, and Local Area Network (LAN) card, and an audio device capable of providing audio information are assembled in the main body. The display outputs information supplied from the main body in an image form. The display is foldable with respect to the main body by being hinged to a side of the main body. In addition, the display is connected to the main body by a ribbon-type cable.

The display cannot be separated from the main body because the display is directly hinged to the main body, and because the main body and the display are electrically connected by a ribbon-type cable. That is, when the main body or the display malfunctions, or reaches the end of its service life, or the display is replaced with a different size display, a user cannot directly replace the display with another. In addition, since the ribbon-type cable is exposed to the outside, the appearance of the electronic appliance is undesirable.

Exemplars of the art are U.S. Pat. No. 5,138,565 issued to Satou for Shielded Electronic Apparatus Having A Removable Shielded Display, U.S. Pat. No. 5,253,139 issued to Satou for Portable Electronic Apparatus Haivng A Detachable Display Unit And a Socket Lid, U.S. Pat. No. 5,347,630 issued to Ishizawa et al. for Computer System Having A Detachable Display, U.S. Pat. No. 4,926,365 issued to Hsieh for Portable Computer System, U.S. Pat. No. 5,262,759 issued to Moriconi et al. for Removable Computer Display Interface, U.S. Pat. No. 5,796,576 issued to Kim for Notebook Computer Having A Hinge Device Enabling A Display Unit to Be Separable from A Main Body, U.S. Pat. No. 4,749,364 issued to Arney et al. for Display Attachment Apparatus.

I have noticed the art does not show an easy and reliable way of providing a display connection structure of an electronic appliance capable of allowing a display to be detachable from the main body of the electronic appliance.

SUMMARY OF THE INVENTION

To solve the above problems, it is an objective of the present invention to provide a display connection structure of an electronic appliance, capable of allowing a display to be detachable from the main body of the electronic appliance.

It is another object to reduce the susceptibility to electromagnetic interference for a display unit for an electronic appliance.

It is yet another object to produce a safe disconnection of a display from the main body of an electronic appliance.

It is still another object to have the power disconnect simultaneously with the disconnection of the display unit from the main body of an electronic appliance.

It is still yet another object to have a quick and reliable disconnection and connection of a display device from a main body of an electronic appliance.

Accordingly, to achieve the above objective, there is provided a display connection structure of an electronic appliance having a main body; a display for receiving an image signal from the main body and displaying an image; a connection unit including hinge pins rotatably installed at the main body, and housings provided at the display so as to be connected to the hinge pins and to pivot together with the hinge pins for detachably connecting the display to the main body; and an optical connector having portions provided at the main body and the display to correspond to each other for transmitting an image signal by means of light.

Here, it is preferable that the housing has a housing body having a front frame and a rear frame, and being secured to the display; and a hinge bracket installed in the housing body, provided with engagement slots fitted to the hinge pins during connection of the display to the main body.

It is preferable that the connection unit further has supporting brackets secured to the main body for supporting the hinge pins so that the hinge pins can be exposed to the outside of the main body.

In addition, it is preferable that the connection unit further has locking-unlocking units each for locking the housing and the hinge pins together, or unlocking the housing and the hinge pins from each other, and the locking-unlocking unit has a locking member movably installed within the housing to engage with or disengage from the locking groove formed at the head of the hinge pin; an elastic member for elastically biasing the locking member toward the locking groove so that the locking member can be locked into the locking groove; and an unlocking lever installed to be projected and exposed to the outside of the housing through an elongated guide hole formed at the housing, and to be movable within the elongated guide hole.

It is preferable that a sloped guide groove is formed at the head of the hinge pin for guiding the locking rod so that the locking rod can be engaged with the locking groove.

It is preferable that the optical connector has a light-emitting module having a laser diode array in which each diode emits light independently according to a driving signal, the light-emitting module being connected to a hinge pin so that it can pivot together with the hinge pin; and a light-receiving module having a photodetector array in which each photodetector converts an incident light signal into an electrical signal independently, the light-receiving module being installed at the display to be coupled with the light-emitting module so as to be able to pivot together with the light-emitting module.

It is preferable that the light-emitting module has a first holder supported on the hinge pin, a recessed portion formed at the engagement surface of the first holder, into which recessed portion the photodetector array is correspondingly inserted, and the laser diode array is installed in the recessed portion to be exposed toward the light-receiving module.

On the other hand, it is preferable that the light-receiving module has a second holder for supporting the photodetector array installed at a projected leading edge thereof; a base installed at the display and provided with an opening for supporting the second holder to be movable inward and outward; and an elastic member installed in the base for elastically biasing the second holder outward so that the second holder can be projected to the outside of the base.

In addition, it is preferable that the optical connector further has a positioning unit for guiding the light-receiving module so that the light-receiving module can be joined to the light-emitting module, and for preventing unstable movement of the light-receiving module when the light-receiving module is joined to the light-emitting module, and the positioning unit includes a plurality of reference holes formed at the engagement surface of the light-emitting module in a first case, and the light-receiving module in a second case; guide pins installed at the light-receiving module if the reference holes are installed in the light-emitting module, and at the light-emitting module if the reference holes are installed at the light-receiving module, to face the reference holes; and a pressing member for elastically pressing against one side of the light-emitting module in the direction of the axis of the hinge pin.

In addition, it is preferable that the positioning unit further has a pair of first main electrodes installed to be elastically movable within two respective reference holes, and elastic members for elastically pressing the respective first main electrodes outward; and the guide pins include a pair of second main electrodes made of a conductive material so as to be electrically connected to the respective first main electrodes and to electrically connect the display to a main power source of the main body when the display is connected to the main body.

In addition, it is preferable that the display connection structure further has a switching device for electrically connecting or disconnecting the first main electrodes and the second main electrodes one by one during assembly or disassembly of the main body and the display, and the switching device has a pair of elastic switches provided in the light-emitting module to correspond to the respective first main electrodes, the elastic switches being positioned at different distances from the first main electrodes so that the first main electrodes are connected to or disconnected from the switches one by one when the first main electrodes approach or are separated from the elastic switches; and when the modules are separated from each other, the first main electrodes and the second main electrodes are separated from each other after the first main electrodes are separated from the respective elastic switches one by one.

In addition, it is preferable that the light-emitting module has a first holder, at a leading end surface of which a recessed portion, into which the photodetector array is inserted when the modules are connected to each other, is formed, the first holder supporting the laser diode array in the recessed portion so that the laser diode array can be exposed toward the outside; a first case pivotably installed at the main body for supporting the first holder so that the first holder can be moved inward and outward and the recessed portion can face the light-receiving module; and an elastic member installed in the first case for pressing the first holder toward the outside of the first case.

In addition, it is preferable that the optical connector further has a second connection unit for connecting the light-emitting module and the light-receiving module to each other so that optical signal transmission can be performed between the modules positioned a remote distance from each other, and the second connection unit has an optical fiber bundle installed to correspondingly face the light-emitting module and the light-receiving module for transmitting light beams emitted from the laser diode array to the light-receiving module; a first coupler for coupling one end of the optical fiber bundle to the light-emitting module; and a second coupler for coupling the other end of the optical fiber bundle to the light-receiving module.

It is preferable that the first coupler has a light-receiving array for receiving light beams emitted from the light-emitting module; a first holder for supporting the light-receiving array at a leading end thereof so that the light-receiving array can be connected to one end of the optical fiber bundle; a first body provided with through-holes for supporting the first holder so that the first holder can move inward and outward; an elastic member installed in the first body for elastically pressing the first holder outward; elastically deformable hook members installed in the first body so as to be hooked in locking slots formed at the light-emitting module when the first coupler is coupled to the light-emitting module; and release buttons installed to be moved inward and outward through the respective through-holes for releasing the hook members from the locking slots.

On the other hand, it is preferable that the second coupler has a light-emitting array for emitting light beams to be transmitted through the optical fiber bundle; a second holder for supporting the light-emitting array at a leading end thereof so that the light-emitting array can be connected to the other end of the optical fiber bundle; a second body provided with through-holes for supporting the second holder so that the second holder can move inward and outward; an elastic member installed in the second body for elastically pressing the second holder outward; elastically deformable hook members installed in the second body so as to be hooked in locking slots formed at the light-receiving module when the second coupler is coupled to the light-receiving module; and release buttons installed to be moved inward and outward through the respective through-holes for releasing the hook members from the locking slots.

It is preferable that a power connection-disconnection device is further provided for stopping the operation of the laser diodes during disassembly, by selectively connecting or disconnecting the power connections between the light-emitting module and the light-receiving module when the display and the main body are assembled or disassembled. The power connection-disconnection device has an auxiliary power source for powering the laser diode array; a driving portion provided at the main body for driving the laser diodes; a pair of first auxiliary electrodes installed at the light-emitting module and electrically connected to the auxiliary power source and the driving portion, respectively; and a pair of second auxiliary electrodes installed at the light-receiving module to be connected to the respective first auxiliary electrodes when the modules are assembled, and electrically connected to each other so that the power of the auxiliary power source can be transferred to the driving portion via the first auxiliary electrodes.

In addition, it is preferable that the power connection-disconnection device further has a pair of connection switches, installed within the light-emitting module so as to correspond to the respective first auxiliary electrodes, positioned at different distances from the first auxiliary electrodes so as to be connected to or disconnected from the first auxiliary electrodes through elastic deformation one by one when the display and the main body are assembled or disassembled, and electrically connected to the driving portion and the auxiliary power source, respectively.

It is preferable that the display connection structure further has at least one pair of assembly-disassembly angle adjusting unit that restricts assembly-disassembly of the display so that the display can be connected to or disconnected from the main body only at a predetermined angle with respect to the main body, and can be connected to the main body with ease, and the assembly-disassembly angle adjusting device having a first adjustment portion for restricting the assembly-disassembly angle between the hinge pin and the housing; and a second adjustment portion for automatically returning the optical connector to a predetermined position so that the position of the optical connector can be aligned with the assembly-disassembly angle adjusted by the first adjustment portion.

It is preferable that the first adjustment portion includes an engagement pin formed to be projected from a side of the housing; and a cover member installed at the main body so as to cover a portion of the hinge pin, and having a guide groove provided at a side of the cover member to correspond to the engagement pin for guiding the engagement pin at the assembly-disassembly angle, and having an engagement groove formed to be continued from the guide groove so as to prevent the engagement pin from being separated from the engagement groove at angles other than the assembly-disassembly angle.

On the other hand, it is preferable that the second adjustment portion includes a support member installed at the main body, and having a first housing portion formed to be projected from a side of the support member to have a cylindrical shape and a predetermined radius, and a second housing portion formed to have a larger radius than the first housing portion by a predetermined distance so that stop jaws can be formed at boundaries with the first housing portion; a pivotable member one end of which is connected to the optical connector and the other end of which is rotatably housed in the first housing portion, and which is provided with a support portion formed in a circumferential direction so as to be projected from an end surface thereof and to correspond to the first housing portion; a pivot spring installed between the pivotable member and the support member so that both ends thereof can be selectively supported by both end portions of the support portion and the stop jaws for providing the pivotable member with a restoring force, and where the pivotable member is positioned by the elastic force of the pivot spring so as to be maintained at the assembly-disassembly angle.

In addition, it is preferable that the second adjustment portion further includes a compression spring installed between the pivotable member and the optical connector for pressing the pivotable member toward the support member.

In addition, it is preferable that an engagement hole is formed at one side of the optical connection so that the one end of the pivotable member can be inserted into the engagement hole, and locking projections are formed to be projected from the inner side of the engagement hole so as to prevent the optical connector from rotating with respect to the pivotable member; and locking slots are formed at the one end of the pivotable member inserted into the engagement hole to correspond to the locking projections.

In addition, it is preferable that the laser diode array is installed at a side surface of the recessed portion formed at the engagement surface of the light-emitting module to be exposed to the cavity of the recessed portion, and the photodetector array is installed at a side of the projected portion of the light-receiving module corresponding to the recessed portion to be exposed to the outside; and therefore light beams emitted from the laser diode array are prevented from traveling toward the outside of the recessed portion.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
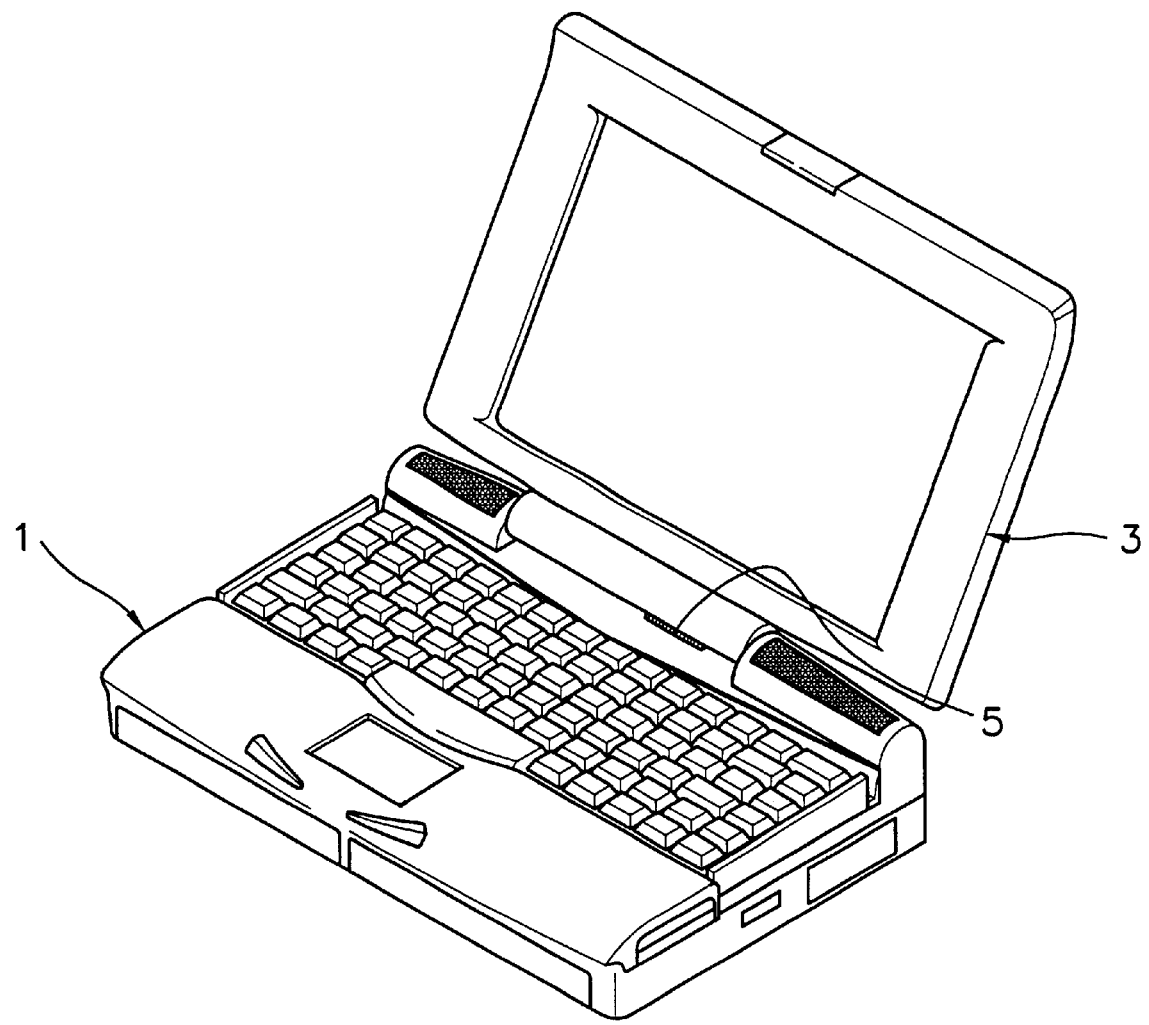
FIG. 1 is a perspective view illustrating a notebook computer as an example of an electronic appliance having a display.
Figure 2:
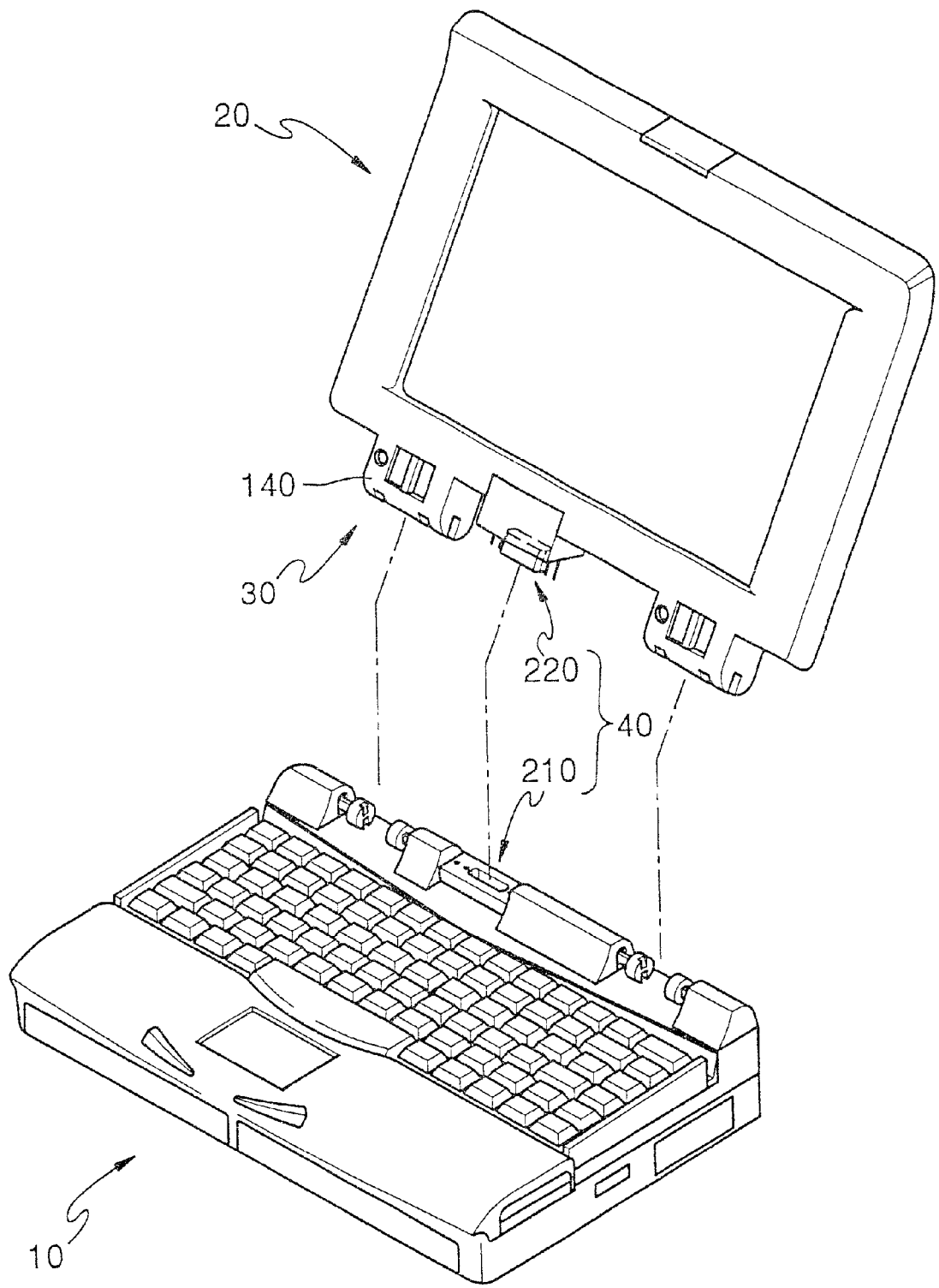
FIG. 2 is a perspective view illustrating a display connection structure of an electronic appliance according to a first embodiment of the present invention.

Turning now to the drawings, as shown in FIG. 1, a notebook computer has a main body 1 equipped with a computer system, and a display 3 for displaying an image according to an image signal transferred from the main body 1.

Input devices such as a keyboard and mouse capable of inputting operational instructions, peripheral devices such as a hard disc drive, optical disc drives such as CD-ROM drive, modem, and LAN card, and an audio device capable of providing audio information are assembled in the main body 1. The display 3 which outputs information supplied from the main body 1 in an image form, is hinged to a side of the main body to be foldable. In addition, the display 3 is connected to the main body 1 by a ribbon-type cable 5.

In an electronic appliance having a display with the above described structure, since the display 3 is directly hinged to the main body 1, and the main body 1 and the display 3 are electrically connected by the ribbon-type cable 5, the display 3 cannot be separated from the main body 1. That is, when the main body 1 or the display 3 malfunctions, or reaches the end of its service life, or the display 3 is replaced with a different size display, a user cannot directly replace the display with another. In addition, since the ribbon-type cable is exposed to the outside, the appearance of the electronic appliance is undesirable.

Referring to FIGS. 2 through 5, a display connection structure according to a first embodiment of the present invention has a main body 10, a display 20 for receiving an image signal from the main body and displaying an image, a connection unit 30 provided at the main body 10 and correspondingly at the display 20 so that the display can be connected to the main body 10, and an optical connector 40 installed at the main body 10 and correspondingly at the display 20 so that an image signal using light can be transferred.

The connection unit 30 has a plurality of supporting brackets 110 installed at the main body 10 and spaced a predetermined distance from each other, hinge pins 120 and 130 rotatably installed at respective brackets 110, housing 160 installed at the display 20 to be connected to the hinge pins 120 and 130 and rotated together with the hinge pins 120 and 130, and locking-unlocking unit for locking the corresponding hinge pins 120 and 130 and housing 160 into each other or unlocking the hinge pins 120 and 130 and housing 160 from each other.

A friction member 112 is installed at each supporting bracket 110 for providing a frictional force for the hinge pin 120 or 130. Therefore, the hinge pins 120 and 130 are restrained from rotating freely and are rotated only by an external force. In addition, the hinge pins 120 and 130 have heads 121 and 131 and insertion portions 123 and 133 which have a predetermined sectional shape so that a hinge bracket 150 which will be described below can be fitted to the insertion portions 123 and 133. In addition, one end of the hinge pin 130 has, for example, a rectangular sectional shape so that the optical connector 40 can be connected to be rotatable together with the hinge pin 130. Here, the supporting brackets 110 and the hinge pins 120 and 130 are covered by a cover 12 (FIG. 4) detachable from the main body 10.

The housing 160 has a housing body 140 having a front frame 141, and a rear frame 143 for being assembled to the front frame 141, and a hinge bracket 150 installed in the housing body 140. The housing body 140 is secured to the display 20, and preferably formed to be integrated with the display 20. In addition, through-holes H are formed at the lower portion of the housing body 140 so that heads 121 and 131 of the hinge pins 120 and 130 can pass through the through-holes H. The hinge bracket 150 is joined between the front frame 141 and the rear frame 143 by a screw S. Engagement slots 151 into which the respective insertion portions 123 and 133 are inserted are formed at the ends of the hinge bracket 150. Therefore, since the engagement slot 151 is engaged with the insertion portion 123 during assembly, the hinge bracket 150 can be pivoted together with the hinge pins 120 and 130. Consequently, the display 20 can be opened or closed with respect to the main body 10. The hinge bracket 150 and the rear frame 143 are also secured by screw S'.

The locking-unlocking unit includes a locking groove 125 formed at the head 121 of the hinge pin 120, a locking member 170 movably installed within the housing body 140 so as to be engaged with or disengaged from the locking groove 125, an elastic member 180 for elastically biasing the locking member 170 toward the locking groove 125 so that the locking member can be locked into the locking groove 125, and an unlocking lever 190 for unlocking the locking member 170 from the locking groove 125.

The locking member 170 has a body 173 provided with a through-hole 171, and a locking rod 175 provided at the body 173 for being locked into the locking groove 125. The elastic member 180 has one end connected to the body 173 and the other end connected to the front frame 141, and the elastic member 180 elastically biases the locking member 170 toward the locking groove 125 so that the locking rod 175 can be locked into the locking groove 125. The unlocking lever 190 is inserted through an elongated hole 145 formed at the front frame 141 of the housing body 140, and is connected to the body 173, and is movable within the elongated hole 145. Also, the unlocking lever 190 has a pair of elastic hooks 191, elastically deformable so as to be locked into the through-hole 171 of the body 173. The hooks 191 include a tine 191a with a detent 191b.

In addition, a guide groove 127, as a structure for guiding the locking rod 175 so that it can be engaged with the locking groove 125, is formed with a slope at the head 121 of the hinge pin 120.

The optical connector 40 includes a light-emitting module 210 pivotably installed at the main body 10, a light-receiving module 220 installed at the display 20 to correspond to the light-emitting module 210, and a positioning unit for guiding the light-receiving module 220 so that it can be joined to the light-emitting module 210, and for preventing unstable movement of the light-receiving module 220 when it is joined to the light-emitting module 210.

The light-emitting module 210 includes a laser diode array 211 in which each diode emits light independently according to a driving signal, and a first holder 213 pivotally supported on the hinge pin 130. The laser diode array 211 is installed to be exposed toward the light-receiving module 220 at a recessed portion 214 formed to be recessed at the engagement surface of the first holder 213. Such a laser diode array 211 has a plurality of laser diodes. A first shaft hole 210a of a predetermined shape is provided at one side of the first holder 213 to correspond to one end of the hinge pin 130. In addition, at the other end of the first holder 213, a second shaft hole 210b is recessed to correspond to a shaft portion 11 formed at the main body 10. A cable C is installed to be connected to the laser diode array 211 via the second shaft hole 210b and the shaft portion 11.

The light-receiving module 220 includes a photodetector array 221 where each component photodetector converts an incident light signal into an electrical signal, a second holder 223 for supporting the photodetector array 221 installed at a leading edge thereof, a base 225 installed at the display 20 for supporting the second holder 223 and allowing it to move inward and outward, and an elastic member 227 installed in the base for elastically biasing the second holder 223 outward. The photodetector array 221 has a plurality of photodetectors. The second holder 223 is projected outward via an opening formed at the base 225 so that the leading edge of the second holder 223 can be inserted into the recessed portion 214 of the first holder 211 during assembly.

The positioning unit includes reference holes 210c formed around the recessed portion 214 of the first holder 213, guide pins 228 installed at the base 225 to correspond to the reference holes 210c, and a pressing member 219 installed in the second shaft hole 210b for elastically pressing against one side of the light-emitting module 210. Since the guide pins 228 are inserted into the reference holes 210c when the light-emitting module 210 and the light-receiving module 220 are assembled, inadequate assembly can be prevented. In addition, since the first holder 213 is elastically biased toward the hinge pin 130 by the pressing member 219, the first holder 213 is prevented from moving right or left.

In addition, as members of the connection unit 30, a pair of first main electrodes 216 are installed, one in each of the reference holes 210c, for electrical connection between the main body 10 and the display 20. The first main electrodes 216 are elastically biased outward by elastic members 212 installed in the corresponding reference holes 210c. In addition, the guide pins 228 include a pair of second main electrodes 228a for being electrically connected to the first main electrodes 216 during assembly. Since the second main electrodes 228a are made of a conductive material, the second main electrodes 228a serve both to guide the module 220 to the module 210 for assembly and to electrically connect the main body 10 and the display 20.

Moreover, a switching unit is further included for electrically connecting or disconnecting the first main electrodes 216 and the second main electrodes 228a, one by one during assembly or disassembly of the main body 10 and the display 20.

The switching unit includes a pair of elastic switches 218a and 218b installed in the first holder 213 to each correspond to one of the first main electrodes 216. The elastic switches 218a and 218b are installed at different distances from the first main electrodes 216 so as to be connected to or disconnected from the first main electrodes 216 one by one when the first electrodes 216 are inserted or withdrawn. It is preferable that the elastic switch 218a positioned farther from the first main electrodes 216 is connected to a main power source 231 of the main body 10 and the other elastic switch 218b is connected to a ground portion (not shown) of the main body 10. Therefore, when the display 20 is separated from the main body 10, the connection between the first main electrode 216 and the elastic switch 218a is separated first. Then, after the power supply from the main power source 231 is disconnected, the other elastic switch 218 is disconnected. Since the power connections between the main body 10 and the display 20 are disconnected one by one, the possibility of fatal errors occurring during disassembly in an IC for driving the display 20, or in circuits of the main body 10 can be lowered.

In addition, a power connection-disconnection unit is further provided for stopping the operation of the laser diodes during disassembly by selectively connecting or disconnecting the power connections between the light-emitting module 210 and the light-receiving module 220, when the display 20 and the main body 10 are assembled or disassembled.

The power connection-disconnection unit includes an auxiliary power source 232 provided at the main body 10, a driving portion 233 provided at the main body 10 for driving the laser diodes, a pair of first auxiliary electrodes 217 installed at the light-emitting module 210, one of which is electrically connected to the auxiliary power source 232 and the other to the driving portion 233, a pair of second auxiliary electrodes 228b installed to be projected from the engagement surface of the base 225 to correspond to the first auxiliary electrodes 217, and a pair of connection switches 238a and 238b.

The pair of first auxiliary electrodes 217 are installed to be movable within the reference holes 210c. In addition, the first auxiliary electrodes 217 are elastically biased outward by the elastic members 212 installed within the reference holes 210c. Such first auxiliary electrodes 217 are elastically connected to the respective connection switches 238a and 238b when depressed by the second auxiliary electrodes 228b.

The second auxiliary electrodes 228b have a function of guiding the connection of the display 20 to the main body 10 as they are formed to be included in the guide pins 228, and another function of electrically connecting to the first auxiliary electrodes 217 during assembly. Such second auxiliary electrodes 228b are electrically connected to each other.

The connection switches 238a and 238b are provided so that the power connections between the light-emitting module 210 and the light-receiving module 220 can be disconnected one by one when the display 20 and the main body 10 are disassembled. Such connection switches 238a and 238b are installed within the first holder 213 to be elastically deformable and to correspond to the first auxiliary electrodes 217, respectively. Also, the connection switches 238a and 238b are positioned at different distances from the first auxiliary electrodes 217. Preferably, the connection switch 238a to be connected to the auxiliary power source 232 is installed farther from the first auxiliary electrodes 217 than the connection switch 238b to be connected the driving portion 233. Therefore, when the display 20 is connected to the main body 10, the first auxiliary electrodes 217 pressed by the second auxiliary electrodes 228b are electrically connected to the connection switches 238a and 238b, respectively. Then, the electric power of the auxiliary power source 232 is transferred to the driving portion 233 to drive the laser diode array 211. To the contrary, when the display 20 is removed from the main body 10, the electrodes 217 and 228b and the connection switches 238a and 238b are respectively disconnected, and the laser diode array 211 shuts down. At this time, the power supply from the auxiliary power source 232 is disconnected first. Therefore, the driving portion 233 and the laser diode array 211 are prevented from malfunctioning due to a sudden interruption of electric power. Also, since the laser diode array 211 does not emit light at the moment when the display 20 is separated from the main body 10, a user is protected from exposure to laser light.

The operation of the display connection structure of an electronic appliance having the above structure according to the first embodiment of the present invention will be described.

Figure 4:
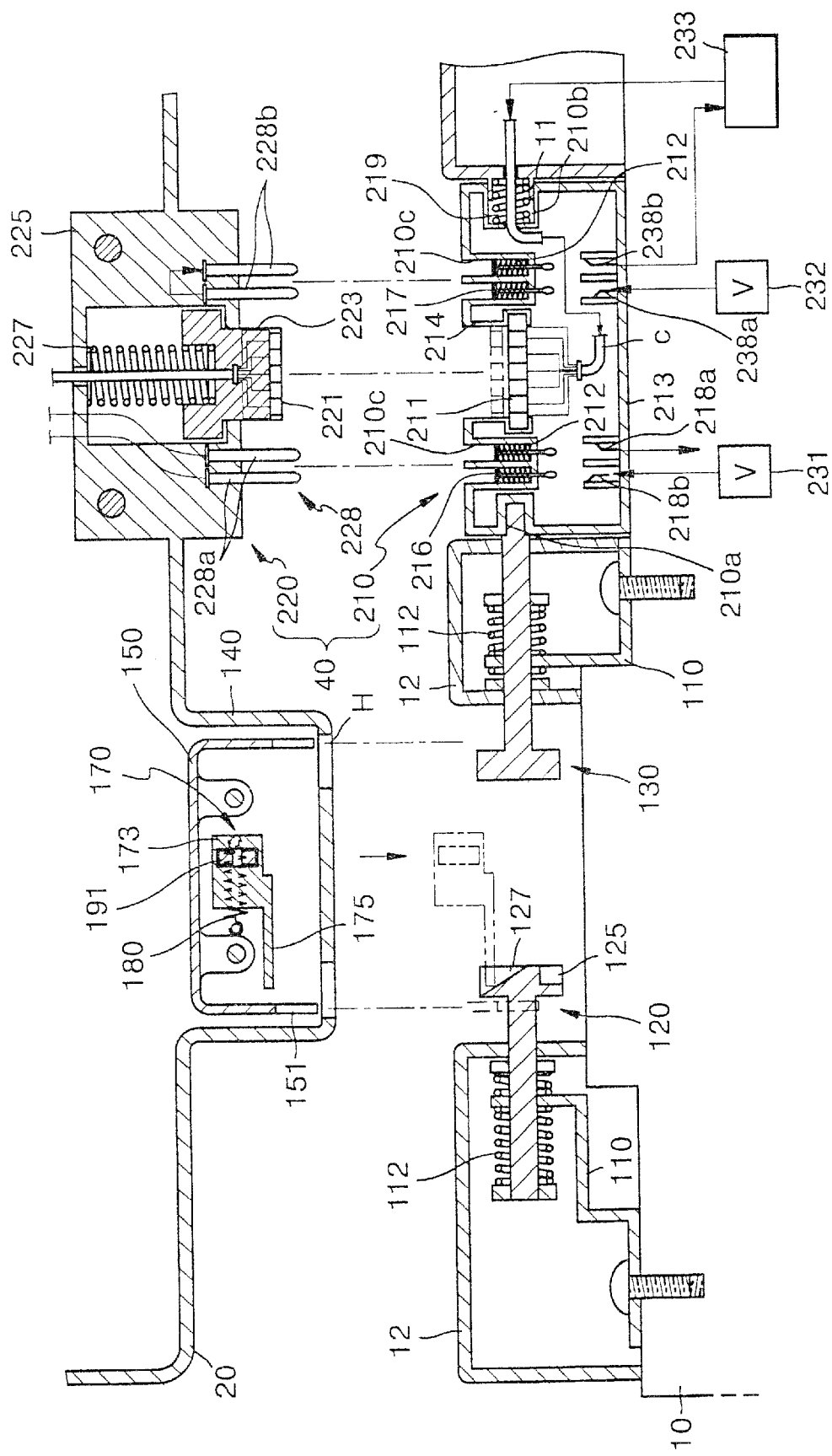
FIG. 4 is a sectional view schematically illustrating a portion of FIG. 2.

First, in order to connect the display 20 to the main body 10, the display 20 is moved toward the main body 10 as shown in FIG. 4. Then, the locking rod 175 is pressed to move toward one side along the guide groove 127. Thereafter, when the display 20 is moved closer to the main body 10, the locking rod 175 reaches the level of the locking groove 125, and is elastically returned to its original position to engage with the locking groove 125. At the same time, the engagement slots 151 of the hinge bracket 150 are inserted into the insertion portions 123 and 133 of the hinge pins 120 and 130 to be secured therein. In addition, the second main electrodes 228a are inserted into the reference holes 210c, and press the respective first main electrodes 216 toward the elastic switches 218a and 218b. Then, one first main electrode 216 is connected to the elastic switch 218b first, and the other first main electrode 216 is connected to the elastic switch 218a later. At the same time, the second auxiliary electrodes 228b are also inserted into the reference holes 210c, and press the respective first auxiliary electrodes 217 toward the connection switches 238a and 238b. Then, one first auxiliary electrode 217 is connected to the connection switch 238b first, and the other first auxiliary electrode 217 is connected to the connection switch 238a later.

Consequently, the photodetector array 221 faces the laser diode array 211 while being spaced a predetermined distance from the laser diode array 211 so that optical transmission can be performed. In addition, electric power is supplied from the main power source 231 to the display 20. Also, electric power from the auxiliary power source 232 is supplied to the driving portion 233 so that the laser diode array 211 is ready to be driven. The display 20 can be opened or closed when being pivoted together with the hinge pins 120 and 130 with respect to the main body 10.

Figure 5:
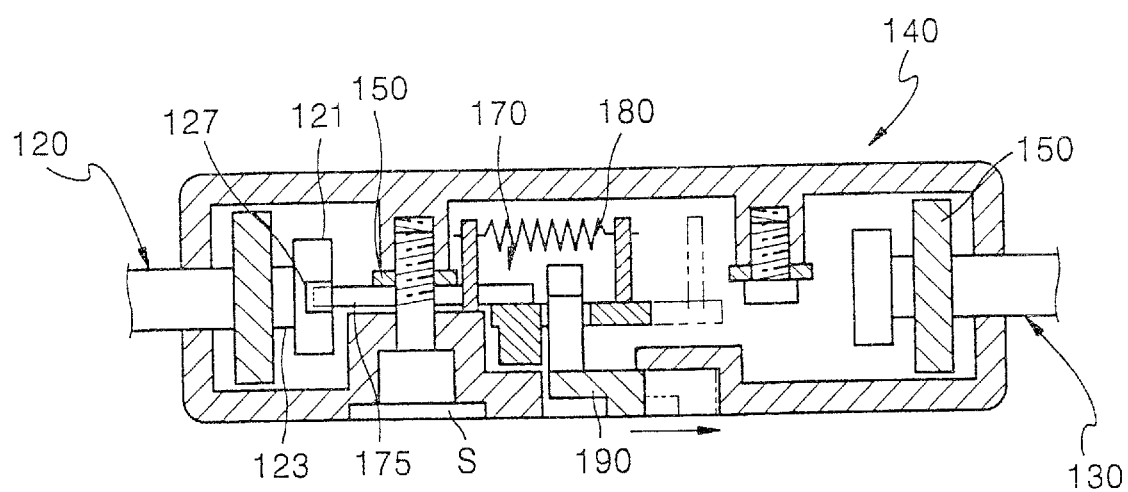
FIG. 5 is a sectional view schematically illustrating a housing portion of FIG. 2.

On the other hand, when the display 20 is to be separated from the main body 10, the unlocking lever 190 is moved to the position marked by hatched lines in FIG. 5. Then, the locking rod 175 is freed from the locking groove 125. Thereafter, the display 20 may be moved slowly withdrawn from the main body 10. At this time, as described above, the first main electrodes 216, the second main electrodes 228a, and the elastic switches 218a and 218b are sequentially disconnected from respective ones. Also, the first auxiliary electrodes 217, the second auxiliary electrodes 228b, and the connection switches 238a and 238b are sequentially disconnected. Accordingly, power supply from the main body 10 to the display 20 is stopped. In addition, since power supply from the auxiliary power source 232 to the driving portion 233 is also stopped, the laser diode array 211 shuts down. Thus, because all power supply is stopped when the display 20 and the main body 10 are disassembled, for example, when the display 20 is disconnected from the main body 10 by mistake while the power source 231 of the main body 10 is connected, the laser diode array 211 does not emit light. Therefore, the user is protected safely from laser exposure.

Figure 6:
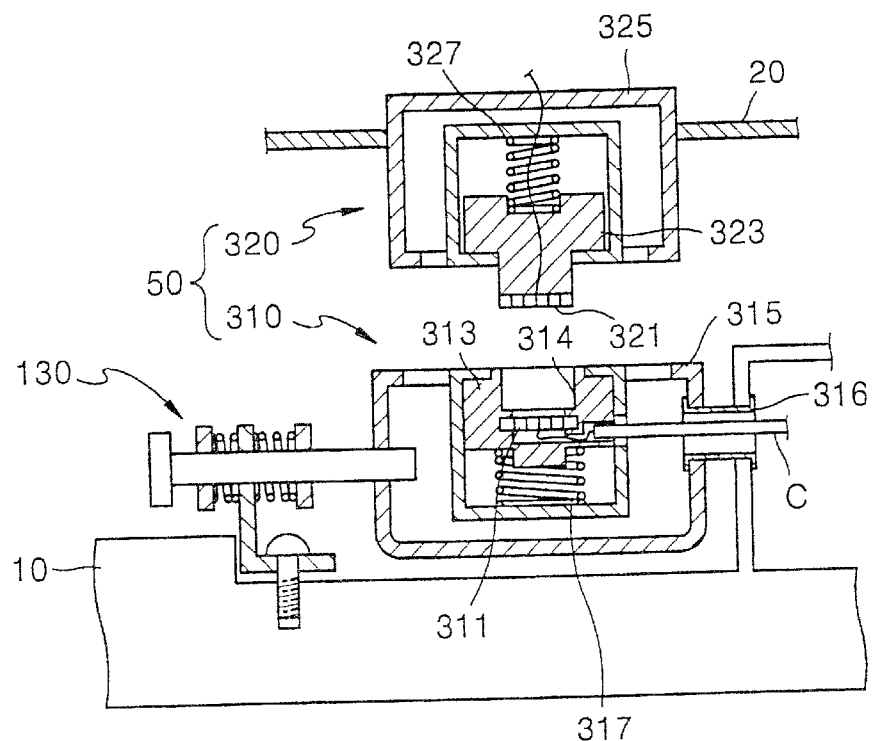
FIGS. 6 and 7 are sectional views illustrating an optical connector portion of a display connection structure of an electronic appliance according to a second embodiment of the present invention.
Figure 7:
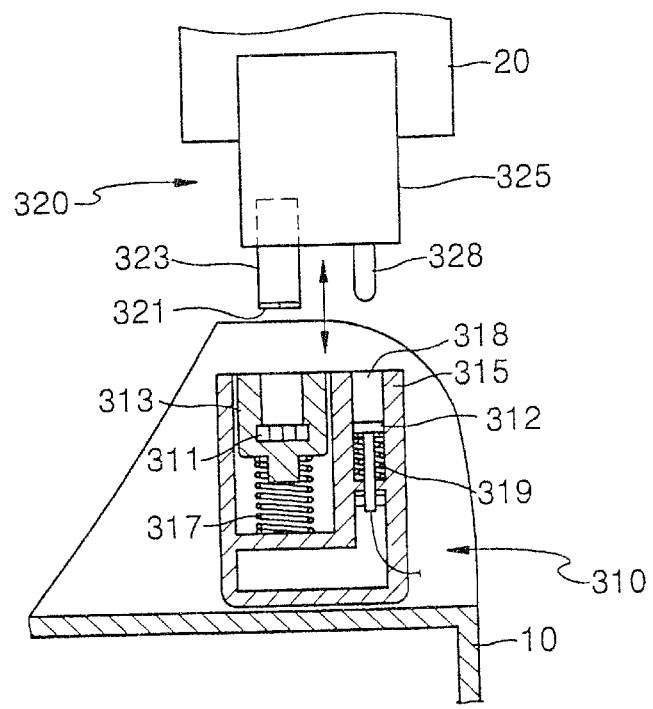

FIGS. 6 and 7 are sectional views illustrating an optical connector portion of a display connection structure of an electronic appliance according to a second embodiment of the present invention.

As shown in FIGS. 6 and 7, an optical connector 50 includes a light-emitting module 310 pivotably installed at a main body 10, and a light-receiving module 320 fixed to a display 20.

The light-emitting module 310 includes a laser diode array 311, a first holder 313, a first case 315, and an elastic member 317. The laser diode array 311 is the same as the member having reference numeral 211 described with reference to FIG. 4. The first holder 313 supports the laser diode array 311. In addition, at a leading end of the first holder 313, a recessed portion 314 is formed to have a predetermined depth. The laser diode array 311 is installed to be exposed at the bottom portion of the recessed portion 314. Such a first holder 313 is housed in the first case 315 to be movable into or out of the first case 315 so that the recessed portion 314 can be exposed to the outside. One side of the first case 315 is connected to a hinge pin 130, and the other is connected to a hollow shaft member 316 rotatably installed at the main body 10. Therefore, the first case 315 is pivotable around the hinge pin 130 and the hollow shaft member 316. In addition, a cable C connected to a driving portion 233 (please refer to FIG. 4) of the main body 10 passes through the hollow shaft member 316, and is connected to the laser diode array 311. The elastic member 317 is installed in the first case 315, and presses the first holder 313 toward the outside of the first case 315.

The light-receiving module 320 has a photodetector array 321, a second holder 323 for supporting the photodetector array 321 which is installed at a lead end of the second holder 323 corresponding to the recessed portion 314, a second case 325, and an elastic member 327. The photodetector array 321 is the same as the member having reference numeral 221 in FIG. 4. The second holder 323 is housed in the second case 325 to be movable, and is elastically biased by the elastic member 327 so as to be exposed to the outside of the second case 325. Therefore, when the display 20 is assembled to the main body 10, the leading end of the second holder 323 is inserted into the recessed portion 314, the photodetector array 321 faces the laser diode array 311 while spaced a predetermined distance from the laser diode array 311.

In addition, a plurality of reference holes 318 are formed at the first case 315, and guide pins 328 corresponding to the reference holes 318 are installed at the second case 325. The guide pins 328 have the same functions as the second main electrodes 228a and the second auxiliary electrodes 228b previously described with reference to FIG. 4. Therefore, electrodes 312 elastically pressed outward by the elastic members 319 are installed in the respective reference holes 318. The electrodes 312 have the same functions as the first main electrodes 216 and the first auxiliary electrodes 217 previously described with reference to FIG. 4.

Since in the optical connector 50 having the above-described structure, the holders 313 and 323 are elastically supported, there is an advantage in that when the light-emitting module 310 and the light-receiving module 320 are assembled, impact between the first holder 313 and the second holder 323 can be reduced.

Figure 8:
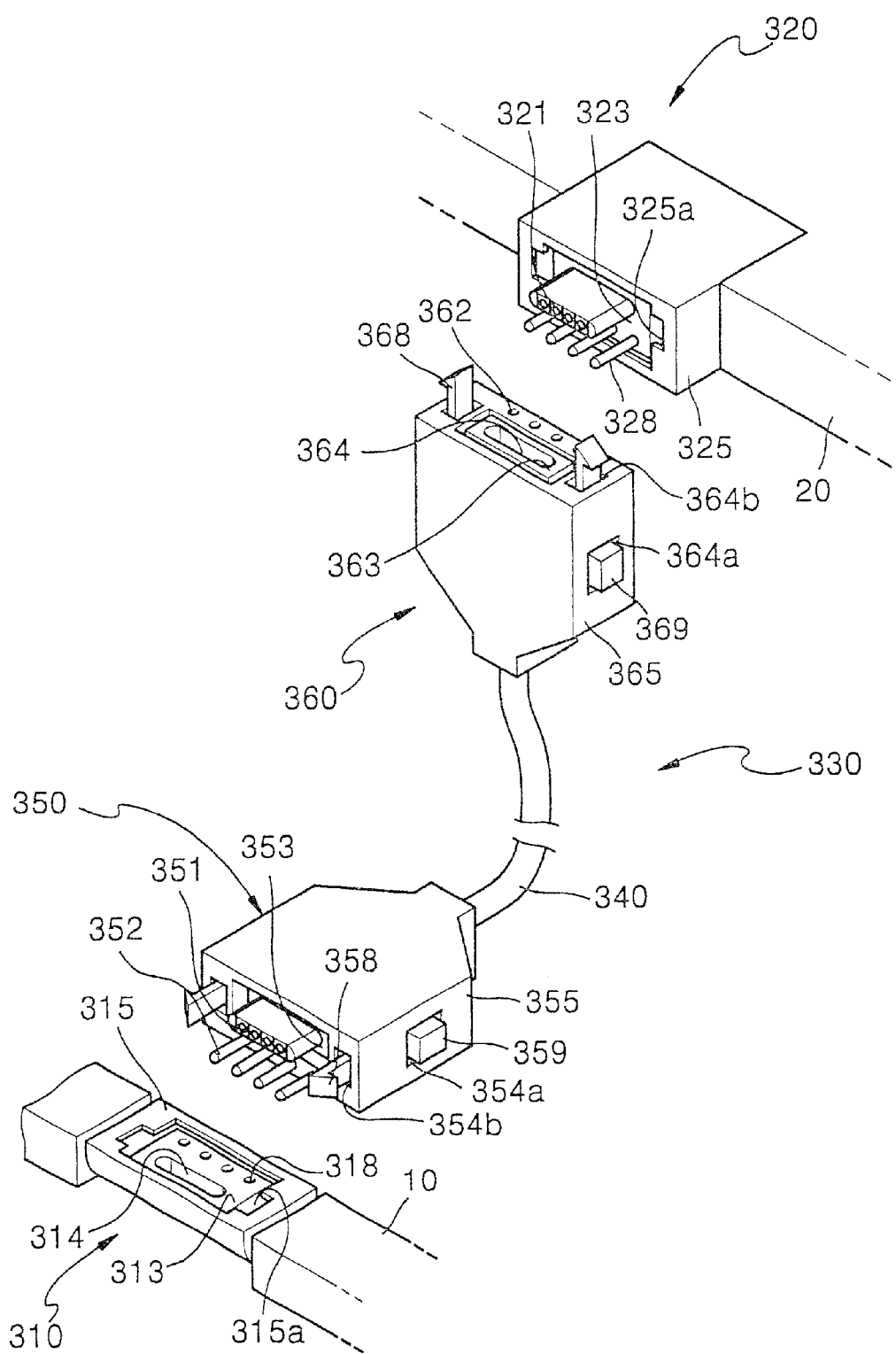
FIG. 8 is an exploded perspective view illustrating an optical connector portion of a display connection structure of an electronic appliance according to a third embodiment of the present invention.
Figure 9:
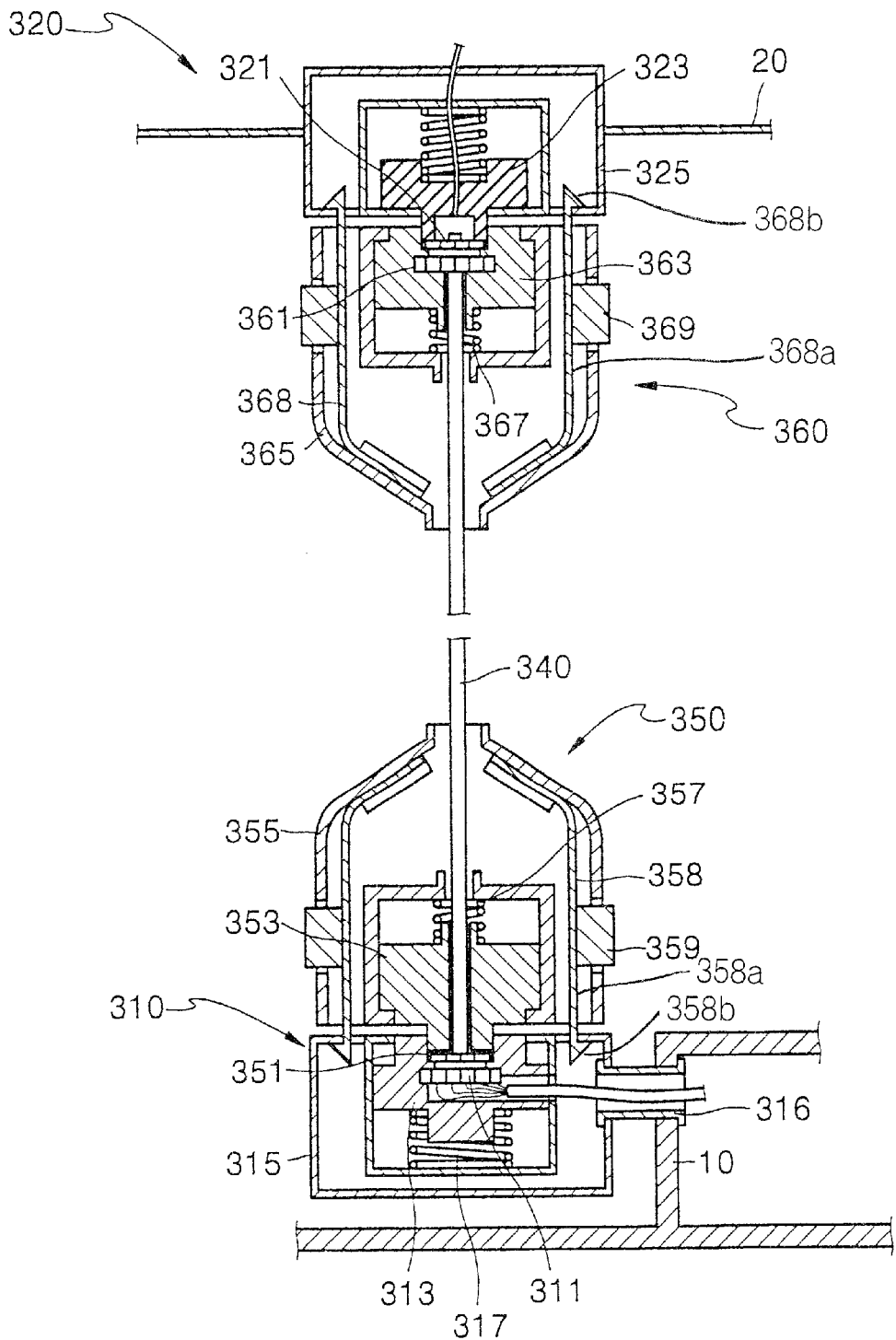
FIGS. 9 and 10 are sectional views schematically illustrating the optical connector portion of FIG. 8 in a connected state.
Figure 10:
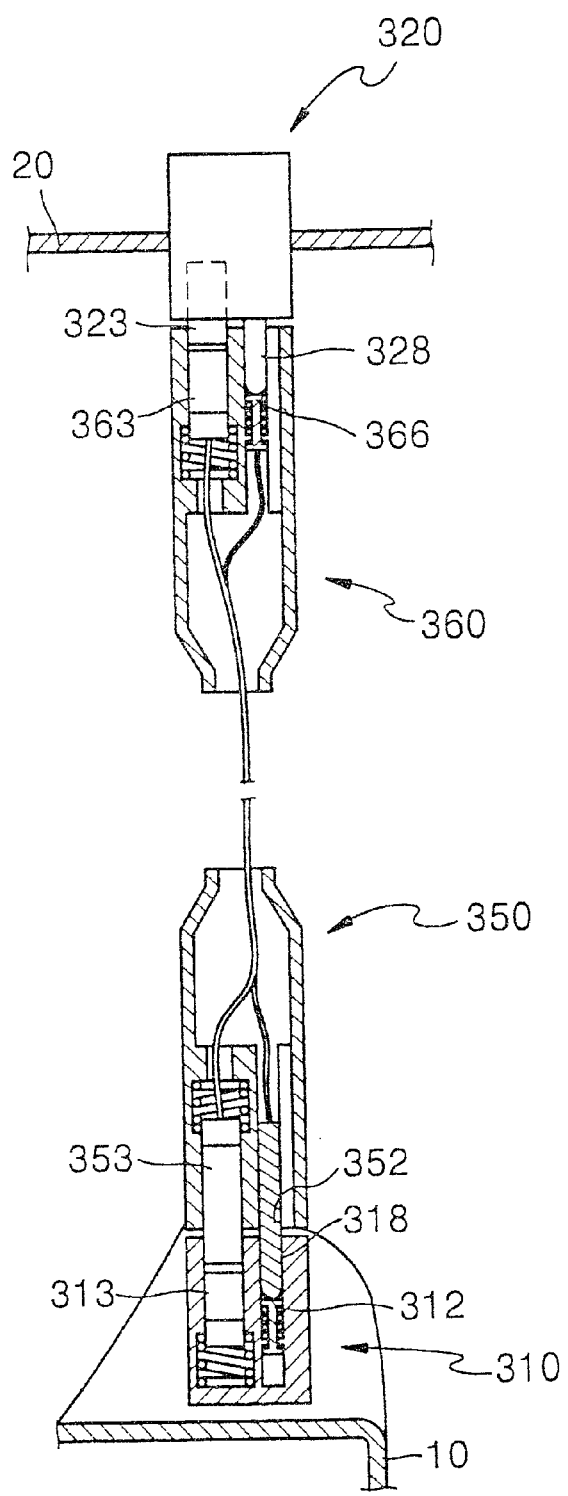

FIGS. 8 through 10 are views illustrating an essential portion of a display connection structure of an electronic appliance according to a third embodiment of the present invention. In the third embodiment, a second connection unit 330 is provided for connecting a light-emitting module 310 and a light-receiving module 320. Here, the same reference numerals used previously to denote members of the first and second embodiments shown in FIGS. 6 and 7, are used here to denote similar members having similar functions.

The second connection unit 330 is intended to make optical transmission and electrical connection between a display 20 and a main body 10 possible when the display 20 is not directly connected to the main body 10, but is connected from a distant position. Such a second connection unit 330 has an optical fiber bundle 340, a first coupler 350, and a second coupler 360.

One end of the optical fiber bundle 340 is installed to face the light-emitting module 310 and the other end is installed to face the light-receiving module 320, for transmitting light beams emitted from a laser diode array 311 to a photodetector array 321. The first coupler 350 for connecting to the light-emitting module 310 is connected to one end of the optical fiber bundle 340. Also, the second coupler 360 for connecting to the light-receiving module 320 is connected to the other end of the optical fiber bundle 340.

The first coupler 350 has a light-receiving array 351, a first holder 353, a first body 355, an elastic member 357, hook members 358, and release buttons 359. The hook members 358 include a tine 358a with a detent 358b. The light-receiving array 351 has the same function and structure as the photodetector array 321 installed at the light-receiving module 320. The first holder 353 has nearly the same structure as that of the second holder 323, and supports the optical fiber bundle 340 and the light-receiving array 351 so that they can be connected. Therefore, the light-receiving array 351 is supported by a leading end of the first holder 353 exposed outside of the first body 355. The first holder 353 which is movable inward and outward, the elastic member 357, and the hook members 358 are all housed in the first body 355. The elastic member 357 elastically presses the first holder 353 toward the outside of the first body 355. In addition, through-holes 354a and 354b are formed at the sides and the front of the first body 355. One end of the hook member 358 is fixed (or secured) to the inside of the first body 355 so that the hook member 358 can be elastically deformed, and the other end passes through the through-hole 354b, and is exposed to the outside of the first body 355. In addition, a release button 359 corresponding to the through-hole 345a is provided for each hook member 358. The release button 359 is movable inward and outward through the through-hole 354a. Therefore, when the first coupler 350 is connected to the light-emitting module 310, the hook member 358 is elastically deformed by a locking slot 315a, formed at a first case 315, to pass the locking slot 315a and then return to its initial form to hook in the locking slot 315a, and connection between the first coupler 350 and the light-emitting module 310 is completed. To the contrary, the first coupler 350 and the light-emitting module 310 can be separated from each other when the release button 359 is pressed so that the hook member 358 can be released from the locking slot 315a.

In addition, the second coupler 360 has a light-emitting array 361 for emitting light, a second holder 363 provided with a recessed portion 364 formed to be recessed from an end portion of the second holder 363 facing the light-receiving module 320, a second body 365 for housing the second holder 363 so that the recessed portion 364 can be exposed to the outside, an elastic member 367 for elastically pressing the second holder outward, hook members 368 installed in the second body 365 so as to be locked in respective locking holes 325a formed at the leading end of the second case 325, and release buttons 369. The hook members 368 include a tine 368a with a detent 368b.

The light-emitting array 361 is intended for illuminating the photodetector array 321 with light transmitted through the optical fiber bundle 340. Therefore, The light-emitting array 361 has the same function and structure as the laser diode array 311 of the light-emitting module 310. In addition, the light-emitting array 361 is supported by the second holder 363 so as to be exposed at the bottom part of the recessed portion 364. The second holder 363 has the same function and structure as the first holder 313, and supports the light-emitting array 361 so as to be connected to the optical fiber bundle 340. The second body 365 has the same structure as the first body 355, and houses the second holder 363 so that the second holder 363 can move. In addition, an elastic member 367 is installed in the second body 365. Through-holes 364a into which release buttons are inserted to be movable inward and outward, are formed at the sides of the second holder 363. Also, through-holes 364b through which the hook members 368 pass, are formed at a leading end of the second holder 363. Therefore, one end of the hook member 368 is fixed to the inside of the second body 365 so that the hook member 368 can be elastically deformed, and the other end passes through the through-hole 364b, and is exposed to the outside of the second body 365. In addition, the release button 369 is provided at each hook member 368 to be movable inward and outward through the through-hole 364a. Therefore, when the hook member 358 is elastically deformed to be locked in the locking hole 325a, the second coupler 360 and the light-receiving module 320 are coupled to each other. In addition, in a coupled state of the second coupler 360 and the light-receiving module 320, the second coupler 360 and the light-receiving module 320 can be separated from each other when the release button 369 is pressed so that the hook member 368 can be released from the locking hole 325a.

On the other hand, a plurality of guide pins 352 corresponding to reference holes 318 of the light-emitting module 310 are installed at the first coupler 350. The guide pins 352 are made of a conductive material so as to be electrically connected to the electrodes 312 (FIG. 10) installed in the reference holes 318, when assembled. Such guide pins 352 have the same functions as the guide pins 328 installed at the light-receiving module 320. In addition, reference holes 362 which the respective guide pins 328 are guided and inserted into, are formed at the second coupler 360. Electrodes 366 to be connected to the guide pins 328 are movably installed in the respective reference holes 328. Each electrode 366 is elastically biased outward by an elastic member. Here, the electrodes 366 and the guide pins 352 are electrically connected to each other via the optical fiber bundle 340.

When the optical connector 50 having the above structure is employed, the display 20 can be used while spaced a desired distance from the main body 10.

Figure 11:
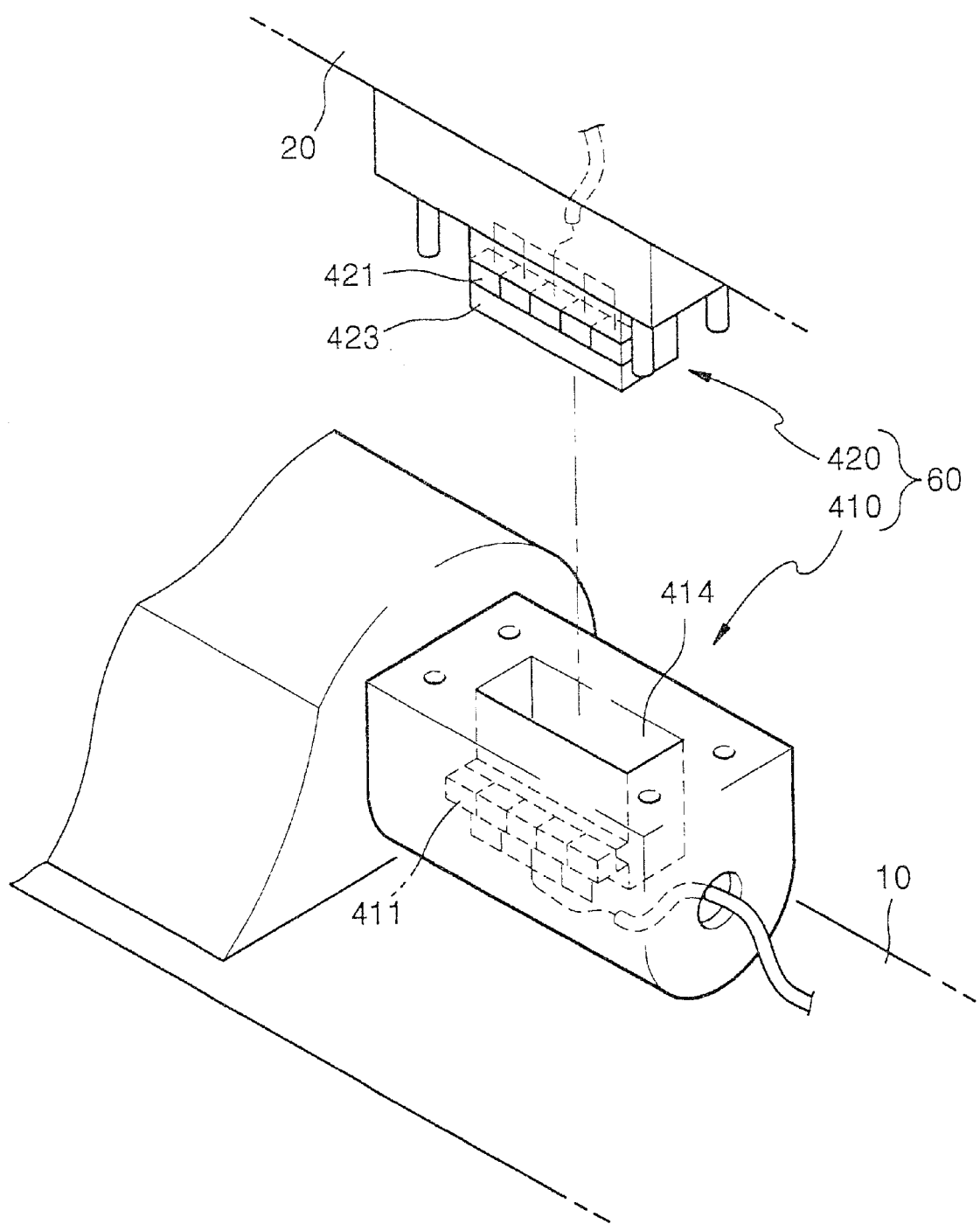
FIG. 11 is an exploded perspective view illustrating an optical connector portion of a display connection structure of an electronic appliance according to a fourth embodiment of the present invention.

FIG. 11 is an exploded perspective view illustrating an essential portion of a display connection structure of an electronic appliance according to a fourth embodiment of the present invention. In FIG. 11, portions of an optical connector 60 are installed at a main body 10 and a display 20. The optical connector 60 has a light-emitting module 410 pivotably installed at the main body 10, and a light-receiving module 420 installed at the display 20 so as to be capable of engaging with the light-emitting module 410.

A recessed portion 414 is formed at a leading side of the light-emitting module 410 facing the light-receiving module 420. In addition, in the light-emitting module 410, a laser diode array 411 is installed at a side surface of the recessed portion 414 to be exposed to the cavity of the recessed portion 414. That is, the laser diode array 411 is installed at the side surface of the recessed portion 414 to be embedded therein. Therefore, the laser diode array 411 faces the opposite side of the recessed portion 414.

A projected portion 423 is formed at the leading end of the light-receiving module 420 so as to correspond to the recessed portion 414. A photodetector array 421 is installed at a side of the projected portion 423 so as to face the laser diode array 411, and to be spaced a predetermined distance from the laser diode array 411 when inserted into the recessed portion 414. Since the diode arrays 411 and 421 are installed to face each other in the recessed portion 414, even though the laser diode array 411 can emit light when the modules 410 and 420 are separated from each other, the emitted light does not travel toward the outside of the recessed portion 414. Therefore, even if the display 20 is erroneously separated from the main body 10 while the laser diode array 411 is operating, the emitted light is prevented from traveling toward a user.

Figure 12:
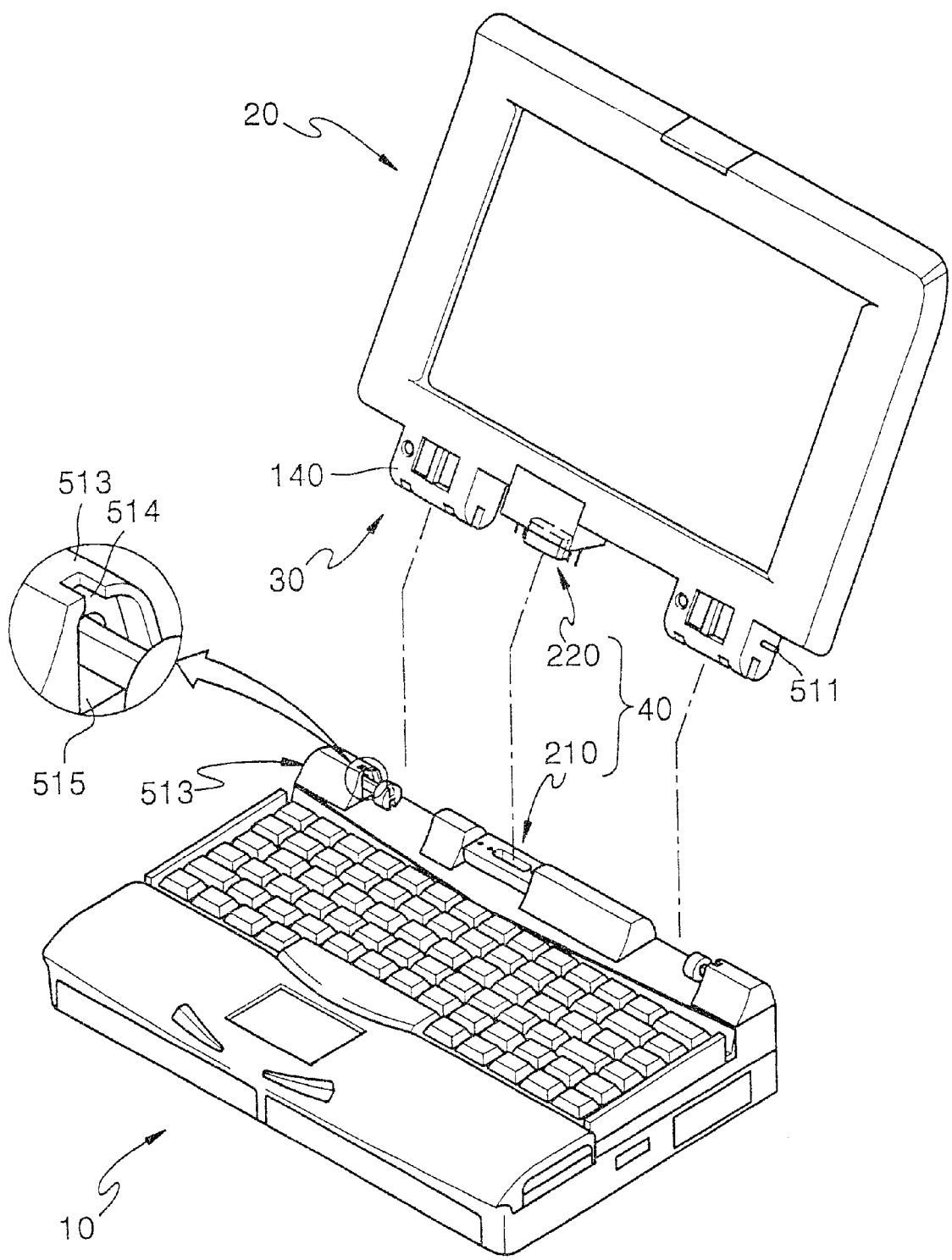
FIG. 12 is an exploded perspective view illustrating a display connection structure of an electronic appliance according to a fifth embodiment of the present invention.
Figure 13:
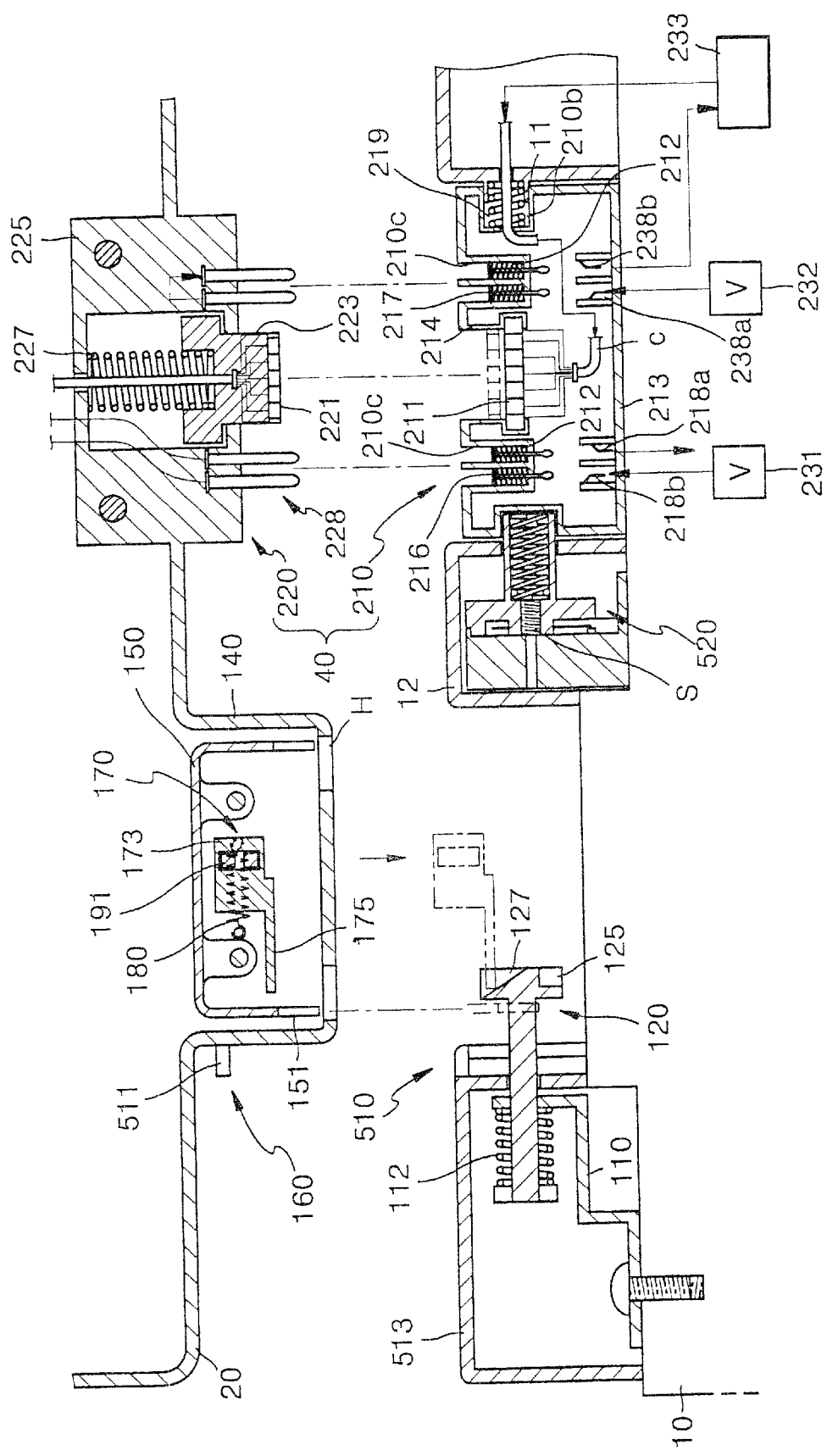
FIG. 13 is a sectional view illustrating a portion of FIG. 12.
Figure 14:
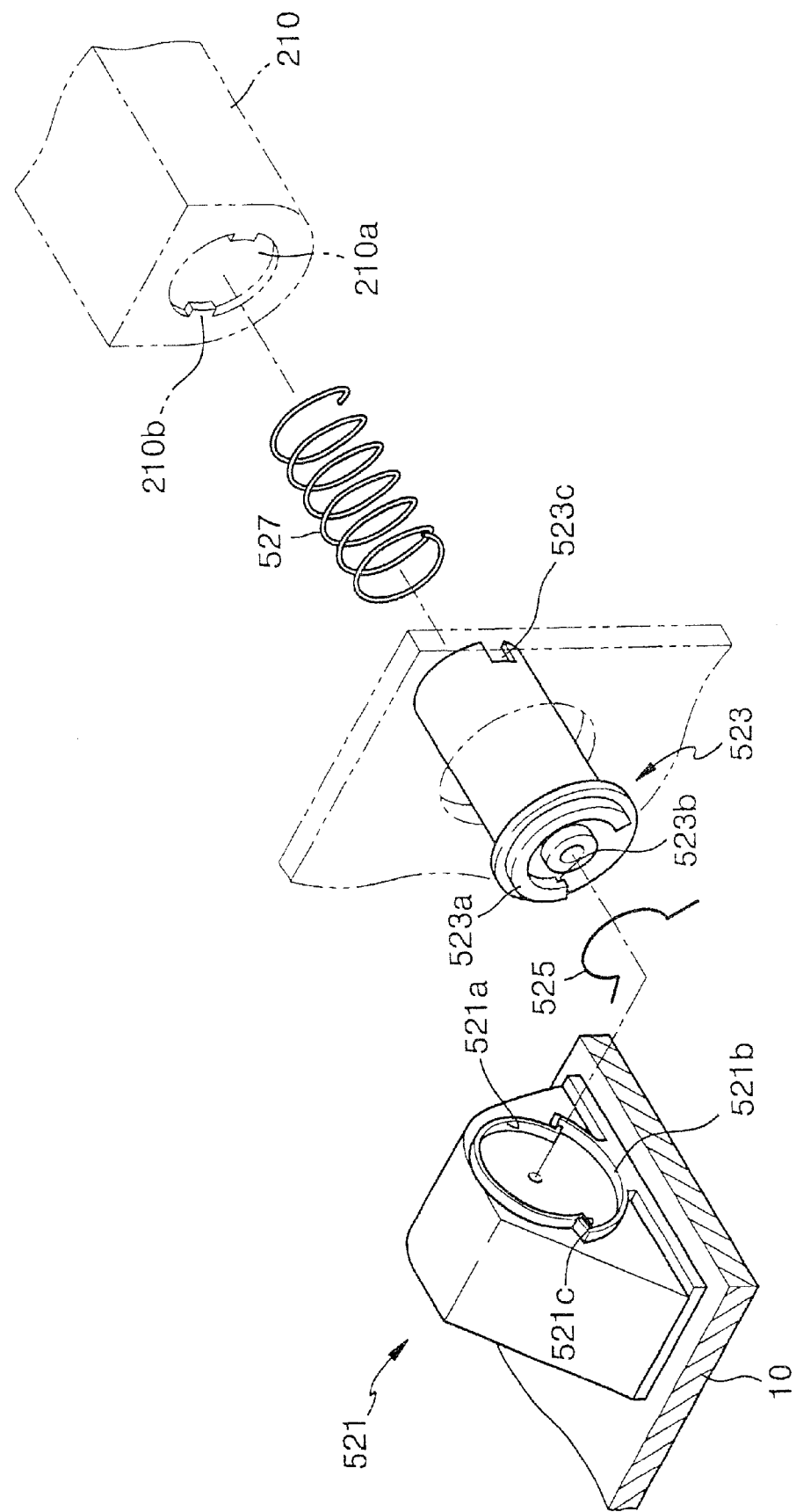
FIG. 14 is a perspective view illustrating an essential portion of FIG. 12.

FIGS. 12 through 14 are views illustrating a display connection structure of an electronic appliance according to a fifth embodiment of the present invention. Here, reference numerals reappearing from FIGS. 2 through 4 denote similar members having similar functions, therefore descriptions thereof will be omitted.

The display connection structure shown in FIGS. 12 through 14 includes a main body 10, a display 20, a connection unit 30 for connection or disconnection of the main body 10 and the display 20, an optical connector 40 having a light-emitting module 210 and a light-receiving module 220, and at least one pair of assembly-disassembly angle adjusting units.

The assembly-disassembly angle adjusting unit is intended to keep an assembly-disassembly angle constant so that the display 20 can be connected to and disconnected from the main body only at a predetermined angle. The assembly-disassembly angle adjusting unit includes a first adjustment portion 510 for restricting the assembly-disassembly angle between a hinge pin 120 and a housing 160, and a second adjustment portion 520 for returning the light-emitting module 210 to a predetermined position in alignment with the assembly-disassembly angle adjusted by the first adjustment portion 510.

The first adjustment portion 510 has an engagement pin 511 formed to be projected from a side of a body 140 of the housing 160, and a cover member 513 installed at the main body 10 so as to cover a portion of the hinge pin 120.

A guide groove 514 for guiding the engagement pin 511 to the assembly-disassembly angle during the insertion or removal of the engagement pin 511, and an engagement groove 515 formed to be continued from the guide groove 514 are formed at a side of the cover member 513. The guide groove 514 guides the engagement pin 511 when it is inserted into the engagement groove 515, and pivots around the hinge pin 120, preventing the engagement pin 511 from separating from the engagement groove 515 at angles other than the assembly-disassembly angle.

Figure 15A:
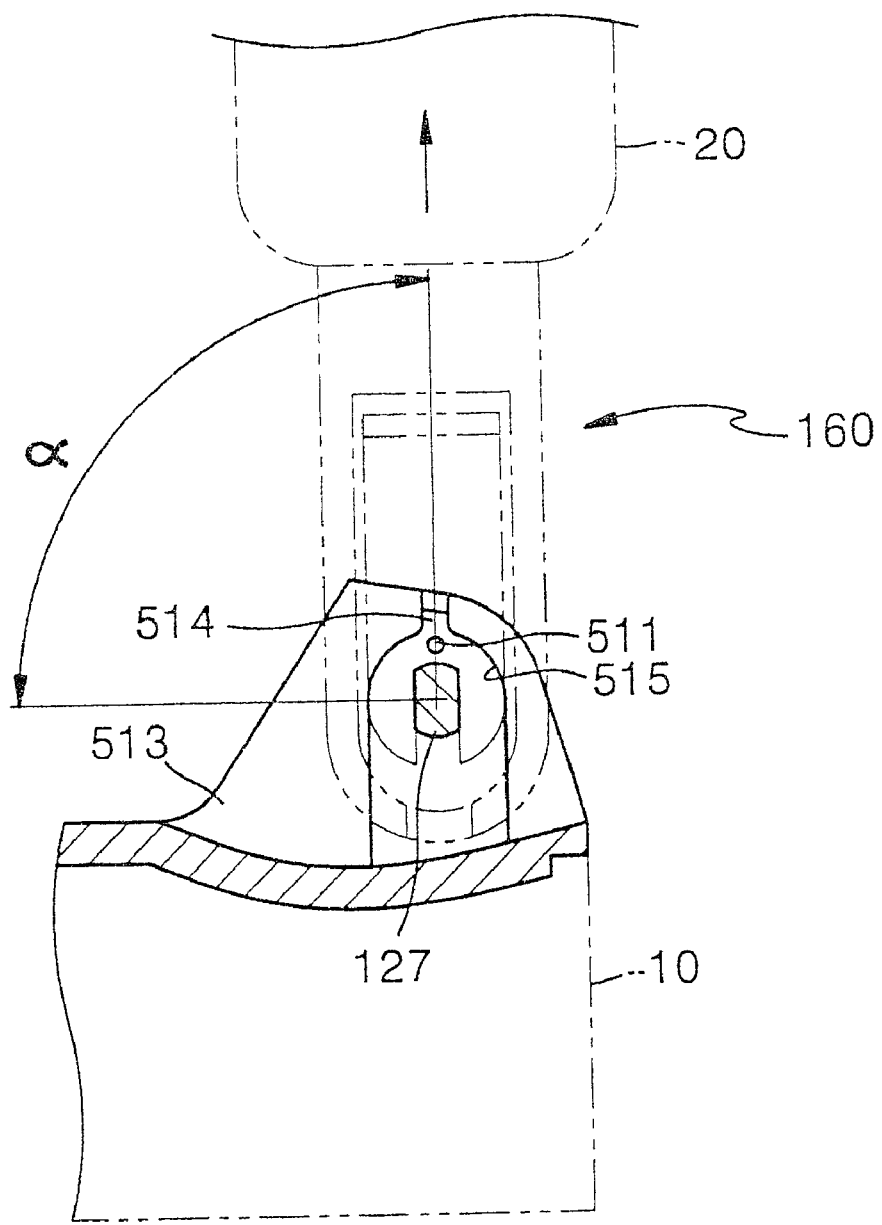
FIG. 15A is a sectional view schematically illustrating a state in which a display is positioned at an assembly-disassembly angle with respect to a main body.
Figure 15B:
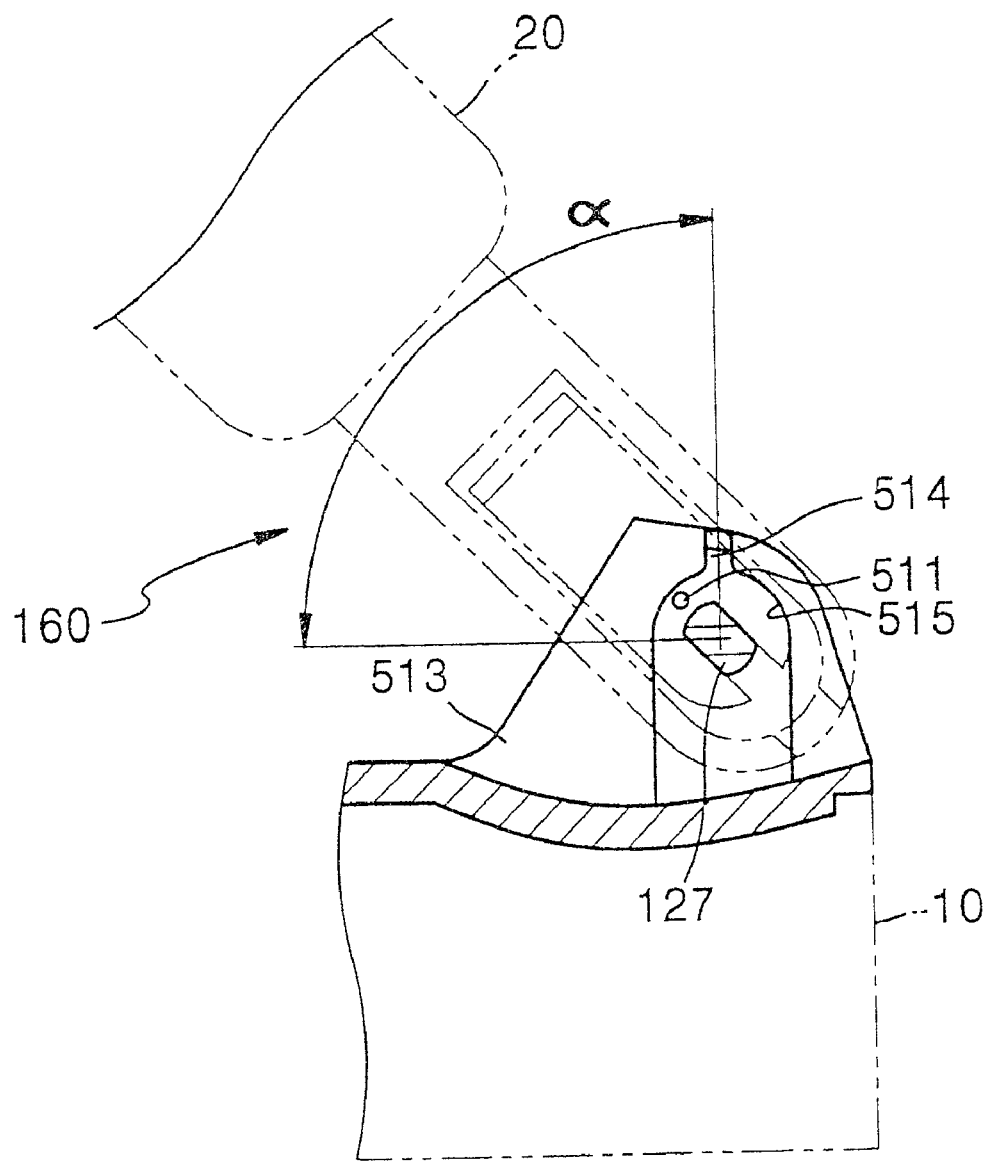
FIG. 15B is a sectional view schematically illustrating a state in which the display assembled to the main body is positioned out of an assembly-disassembly angle.

That is, as shown in FIG. 15A, the engagement pin 511 can move along the guide groove 514 only when the display 20 is positioned to align with the guide groove 514 at the assembly-disassembly angle (α). Otherwise, as shown in FIG. 15B, when the display 20 is out of the assembly-disassembly angle (α), the engagement pin 511 is confined in the engagement groove 515 since the engagement pin 511 is not aligned with the guide groove 514. Therefore, the display 20 cannot be separated from the main body 10 when the display 20 is out of α. In addition, after the display 20 is separated from the main body 10, as long as an external force is not applied to the hinge pin 120, the hinge pin 120 remains at the assembly-disassembly angle (α) since it is restrained from rotating by the friction member 112. Therefore, there is no inconvenience of having to adjust the angle of the hinge pin 120 in the subsequent assembly.

On the other hand, since the display 20 is connected to the main body 10 only at the assembly-disassembly angle (α), the modules 210 and 220 are assembled at the assembly-disassembly angle (α). Therefore, when the display 20 is in a separated state, the light-emitting module 210 must be maintained at the assembly-disassembly angle (α) for the next assembly. To this end, the second adjustment portion 520 has a support member 521 installed at the main body 10, a pivotable member 523 connected to the light-emitting module 210 to rotate with respect to the support member 521, and a pivot spring 525 installed between the support member 521 and the pivotable member 523.

Figure 3:
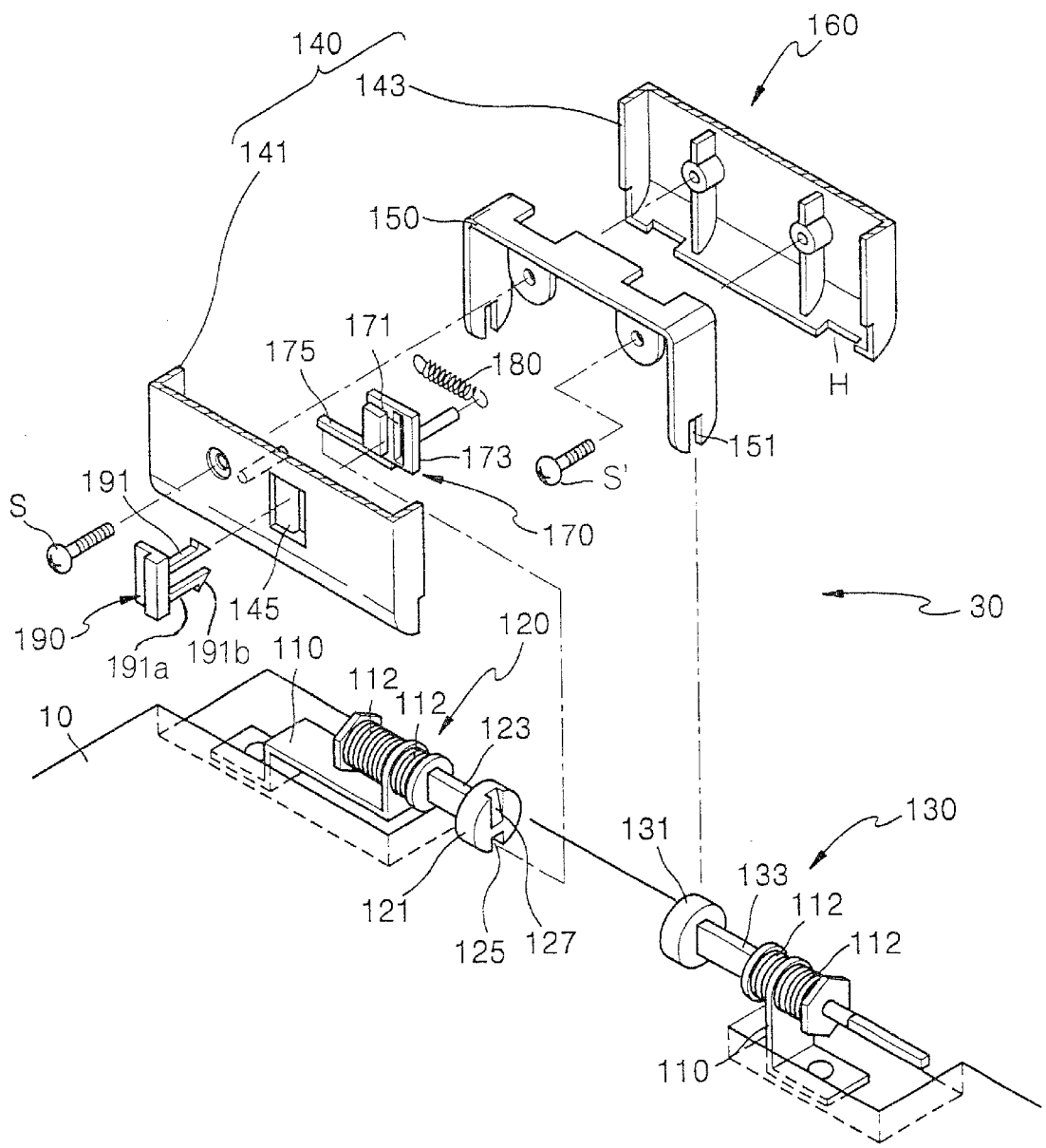
FIG. 3 is an exploded perspective view illustrating an essential portion of FIG. 2.

The support member 521 is installed at the place of the hinge pin 130 of FIG. 3 instead of the hinge pin 130 to be enclosed by a cover 12. The support member 521 has a first housing portion 521a having a cylindrical shape and a predetermined radius, and formed to be projected from a side of the support member 521, and a second housing portion 521b. The second housing portion 521b is formed to have a larger radius than the first housing portion 521a by a predetermined distance, and to be continuous from the first housing portion 521a so that stop jaws 521c can be formed at boundaries with the first housing portion 521a.

A support portion 523a is formed at one end of the pivotable member 523 to be projected therefrom. The support portion 523a has a shape corresponding to that of the first housing portion 521a so that the support portion 523a can be inserted into the first housing portion 521a. That is, the support portion 523a is formed in the shape of a portion of a doughnut around the pivot point. In addition, support jaws 523b are formed at both ends of the support portion 523a to be recessed from the end surfaces. The ends of the pivot spring 525 are housed and supported by the respective support jaws 523b. Therefore, the generally circular pivot spring 525 is installed inside the support portion 523a so that the ends of the pivot spring 525 are confined by the respective support jaws 523b. Also, the ends of the pivot spring 525 are supported by the stop jaws 521c when the support member 521 and the pivotable member 523 are attached to each other by a screw S.

On the other hand, the other end of the pivotable member 523 is connected to one side of the light-emitting module 210 so as to rotate together with the light-emitting module 210. To this end, an engagement hole 210a is formed at one side of the light-emitting module 210 so that the other end of the pivotable member 523 can be inserted into the engagement hole 210a. In addition, locking projections 210b are formed at the wall of the engagement hole 210a. The locking projections 210b are intended to prevent the pivotable member 523 from freely rotating with respect to the light-emitting module 210. Therefore, locking slots 523 are formed at the other end of the pivotable member 523 to correspond to the locking projections 210b. In addition, a compression spring 527 is installed between the pivotable member 523 and the light-emitting module 210. The compression spring 527 presses the pivotable member 523 toward the support member 521. In order to provide an installation space for the compression spring 527, the other end of the pivotable member 523 has an open cylindrical shape.

Figure 16A:
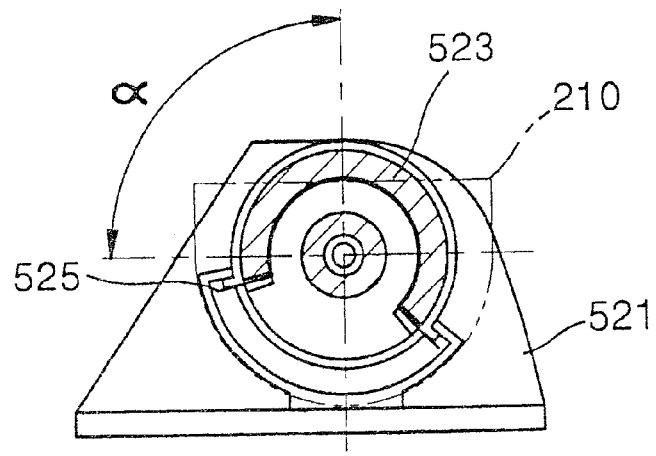
FIG. 16A is a sectional view illustrating the state of a pivot spring when the display is positioned at an assembly-disassembly angle.

In the above structure, as shown in FIG. 16A, before a rotational force is applied to the pivotable member 523, the pivotable member 523 is positioned inside the first housing portion 521a to correspond to the first housing portion 521a. This is because the pivotable member 523 is restrained from rotating since the ends of the pivot spring 525 are supported by the stop jaws 521c while confined by the support jaws 523b. In this state, the light-emitting module 210 connected to the pivotable member 523 is maintained at the assembly-disassembly angle (α) with respect to the main body 10. Therefore, when the display 20 is connected to the main body 10 in this state, the engagement pin 511 is inserted into the engagement groove 515 along the guide groove 514, and the light-receiving module 220 is connected to the light-emitting module 210, simultaneously.

Figure 16B:
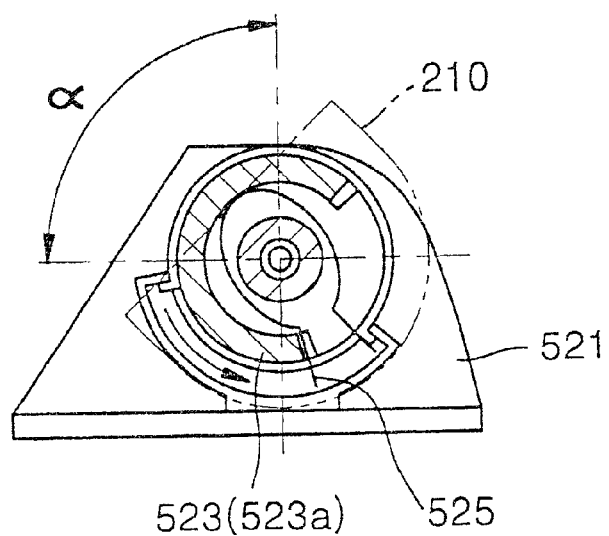
FIG. 16B is a view diagram illustrating the state of a pivot spring when the display is positioned out of an assembly-disassembly angle.

In a state in which the display 20 is connected to the main body 10, when the display 20 is forcedly pivoted, the pivotable member 523 is positioned such that it is acted on by the pivoting force of the pivot spring 525, as shown in FIG. 16B. That is, the pivotable member 523 is pivoted while compressing the pivot spring 525. In addition, since the ends of the pivot spring 525 can be moved within the second housing portion 521, one end of the pivot spring 525 is moved according to the pivot motion of the pivotable member 523.

On the other hand, in a state in which the display 20 is disconnected from the main body 10, when the display 20 is forcedly pivoted, the pivotable member 523 can be positioned by the pivoting force, as shown in FIG. 16B. In this state, when the external force applied to the pivotable member 523 is removed, the pivotable member 523 is returned back to the state shown in FIG. 16A by the elastic force of the pivot spring 525. That is, even though the pivotable member 523 is not aligned with the assembly-disassembly angle ($\alpha$) when pivoted by an external force, when freed from the external force, the pivotable member 523 is returned back to its initial position so that the light-emitting module 210 can be maintained at the assembly-disassembly angle ($\alpha$). Therefore, when the display 20 is connected to the main body 10, the positions of the hinge pin 120 and the light-emitting module 210 need not be adjusted.

As described above, with the display connection structure of an electronic appliance according to the present invention, the display is connected to or disconnected from the main body with ease. Therefore, the display can be replaced with another display exhibiting a higher resolution, or having a larger screen, and the electronic appliance employing the display connection structure is portable.

In addition, when either the display or the main body malfunctions or reaches the end of its useful life, it can be replaced with ease. Since an image signal is transferred by means of light, the generation of extraneous electromagnetic waves, and susceptibility to electromagnetic interference can be reduced. In addition, the display can be positioned a desired distance from the main body by using the connection unit, and still can be connected to the main body, there is an advantage in that the display can be placed according to user's convenience.

Further, since the power supply is disconnected simultaneously with the disconnection of the display, the embodiments of the present invention are safe to use, and power smart. Furthermore, since the assembly-disassembly angle of the display can be preset, and related parts such as the hinge pin and the light-emitting module are automatically aligned with the preset angle, assembly or disassembly of the display can be performed with ease.

What is claimed is:

1. A display connection structure of an electronic appliance, comprising:
   a main body;
   a display receiving an image signal from said main body and displaying an image;
   a connection unit including hinge pins rotatably installed on said main body, and housing provided on said display accommodating connection to said hinge pins and to pivot together with the hinge pins accommodating detachably connecting said display to said main body; and
   an optical connector having portions provided on said main body and said display to correspond to each other accommodating transmitting an image signal by light, with said connection unit further comprising a locking-unlocking unit accommodating locking said housing and said hinge pins together, or unlocking said housing and said hinge pins from each other,
   with said locking-unlocking unit comprising:
      a locking member movably installed within said housing to engage with or disengage from a locking groove formed on a head of said hinge pin;
      an elastic member elastically biasing said locking member toward the locking groove accommodating said locking member to be locked into the locking groove; and
      an unlocking lever installed to be projected and exposed to the outside of said housing through an elongated guide hole formed on said housing, and to be movable within the elongated guide hole.

2. The display connection structure of an electronic appliance as claimed in claim 1, with said housing comprising:
   a housing body having a front frame and a rear frame, and being secured to said display; and
   a hinge bracket installed in said housing body, provided with engagement slots fitted to the hinge pins during connection of said display to said main body.

3. The display connection structure of an electronic appliance as claimed in claim 1, with said connection unit further comprising supporting brackets secured to said main body supporting said hinge pins accommodating hinge pins to be exposed to the outside of said main body.

4. The display connection structure of an electronic appliance as claimed in claim 1, with a sloped guide groove forming on said head of said hinge pin guiding a locking rod accommodating said locking rod to be engaged with the locking groove.

5. A display connection structure of an electronic appliance, comprising:
   a main body;
   a display receiving an image signal from said main body and displaying an image;
   a connection unit including hinge pins rotatably installed on said main body, and housing provided on said display accommodating connection to said hinge pins and to pivot together with the hinge pins accommodating detachably connecting said display to said main body; and
   an optical connector having portions provided on said main body and said display to correspond to each other accommodating transmitting an image signal by light, with said optical connector comprising:
      a light-emitting module having a laser diode array, said laser diode array having each diode emitting light independently according to a driving signal, said light-emitting module being connected to a hinge pin, said light-emitting module pivoting together with said hinge pin; and
      a light-receiving module having a photodetector array, said photodetector array having each photodetector converting an incident light signal into an electrical signal independently, said light-receiving module being installed at said display to be coupled with the light-emitting module, said light-receiving module able to pivot together with said light-emitting module.

6. The display connection structure of an electronic appliance as claimed in claim 5, with said light-emitting module comprising a first holder supported on said hinge pin, a recessed portion formed on an engagement surface of said first holder, said photodetector array being correspondingly inserted into said recessed portion, and said laser diode array being installed in said recessed portion to be exposed toward said light-receiving module.

7. The display connection structure of an electronic appliance as claimed in claim 5, with said light-receiving module comprising:
   a second holder supporting said photodetector array installed on a projected leading edge of said second holder;
   a base installed on said display and providing with an opening supporting said second holder to be movable inward and outward; and
   an elastic member installed in said base elastically biasing said second holder outward accommodating said second holder to be projected to the outside of said base.

8. The display connection structure of an electronic appliance as claimed in claim 5, with said optical connector further comprising a positioning unit guiding said light-receiving module accommodating said light-receiving module being able to be joined to said light-emitting module, and preventing unstable movement of said light-receiving module when said light-receiving module is joined to said light-emitting module.

9. The display connection structure of an electronic appliance as claimed in claim 8, with said positioning unit including:
   a plurality of reference holes formed on an engagement surface of said light-emitting module in a first case, and said light-receiving module in a second case;
   guide pins installed on said light-receiving module if the reference holes are installed in said light-emitting module, and on said light-emitting module if the reference holes are installed on the light-receiving module, said guide pins to face the reference holes; and
   a pressing member elastically pressing against one side of said light-emitting module in a direction of an axis of said hinge pin.

10. The display connection structure of an electronic appliance as claimed in claim 9, with said positioning unit further comprising a pair of first main electrodes installed to be elastically movable within two respective reference holes, and elastic members elastically pressing the respective first main electrodes outward; and said guide pins including a pair of second main electrodes made of a conductive material accommodating electrical connection to the respective first main electrodes and to electrically connect said display to a main power source of said main body when said display is connected to said main body.

11. The display connection structure of an electronic appliance as claimed in claim 10, with said display connection structure further comprising a switching unit electrically connecting or disconnecting said first main electrodes and said second main electrodes one by one during assembly or disassembly of said main body and said display.

12. The display connection structure of an electronic appliance as claimed in claim 11, with said switching unit comprising a pair of elastic switches provided in said light-emitting module to correspond to the respective first main electrodes, said elastic switches being positioned at different distances from said first main electrodes accommodating said first main electrodes being connected to or disconnected from said elastic switches one by one when said first main electrodes approach or are separated from said elastic switches; and when said light-emitting and light-receiving modules are separated from each other, said first main electrodes and said second main electrodes are separated from each other after said first main electrodes are separated from the respective elastic switches one by one.

13. The display connection structure of an electronic appliance as claimed in claim 5, with said light-emitting module comprising:
   a first holder having a recessed portion on a leading end surface of said first holder, said photodetector array being inserted into said recessed portion when said light-receiving and light-emitting modules are connected to each other, said first holder supporting said laser diode array in said recessed portion accommodating said laser diode array to be exposed toward the outside;
   a first case pivotably installed on said main body supporting said first holder accommodating said first holder to be moved inward and outward and said recessed portion to face said light-receiving module; and
   an elastic member installed in said first case pressing said first holder toward the outside of said first case.

14. The display connection structure of an electronic appliance as claimed in claim 5, with said optical connector further comprising a second connection unit connecting said light-emitting module and said light-receiving module to each other, an optical signal transmission performed between said light-emitting module and said light-receiving module when said light-emitting module and said light-receiving module are positioned a remote distance from each other.

15. The display connection structure of an electronic appliance as claimed in claim 5, further comprising a power connection-disconnection unit stopping the operation of said laser diodes during disassembly, by selectively connecting or disconnecting the power connections between said light-emitting module and said light-receiving module when said display and said main body are assembled or disassembled.

16. The display connection structure of an electronic appliance as claimed in claim 15, with said power connection-disconnection unit comprising:
   an auxiliary power source powering said laser diode array;
   a driving portion provided on said main body driving said laser diodes;
   a pair of first auxiliary electrodes installed on said light-emitting module and electrically connected to said auxiliary power source and said driving portion, respectively; and
   a pair of second auxiliary electrodes installed on said light-receiving module to be connected to the respective first auxiliary electrodes when said light-receiving and light-emitting modules are assembled, said second auxiliary electrodes and said first auxiliary electrodes electrically connected to each other accommodating power of said auxiliary power source to be transferred to said driving portion via said first auxiliary electrodes.

17. The display connection structure of an electronic appliance as claimed in claim 16, with said power connection-disconnection unit further comprising a pair of connection switches installed within said light-emitting module, said connection switches corresponding to the respective first auxiliary electrodes, said connection switches positioned at different distances from said first auxiliary electrodes accommodating connection to or disconnection from said first auxiliary electrodes through elastic deformation one by one when said display and said main body are assembled or disassembled, and said pair of connection switches being electrically connected to said driving portion and said auxiliary power source, respectively.

18. The display connection structure of an electronic appliance as claimed in claim 5, said laser diode array being installed at a side surface of a recessed portion formed at an engagement surface of said light-emitting module to be exposed to the cavity of said light recessed portion, and said photodetector array being installed at a side of said projected portion of said light-receiving module corresponding to said recessed portion to be exposed to the outside; and light beams emitted from said laser diode array being prevented from traveling toward the outside of said recessed portion.

19. The display connection structure of an electronic appliance as claimed in claim 14, with said second connection unit comprising:
   an optical fiber bundle installed to correspondingly face said light-emitting module and the light-receiving module transmitting light beams emitted from said laser diode array to said light-receiving module;
   a first coupler coupling one end of said optical fiber bundle to said light-emitting module; and
   a second coupling the other end of said optical fiber bundle to said light-receiving module.

20. The display connection structure of an electronic appliance as claimed in claim 19, with said first coupler comprising:
   a light-receiving array receiving light beams emitted from said light-emitting module;
   a first holder supporting said light-receiving array on a leading end of said first holder, said light-receiving array able to be connected to one end of said optical fiber bundle;
   a first body provided with through-holes supporting said first holder accommodating said first holder being able to move inward and outward;
   an elastic member installed in said first body elastically pressing said first holder outward;
   elastically deformable hook members installed in said first body, said hook members hooking in locking slots formed on said light-emitting module when said first coupler is coupled to said light-emitting module; and
   release buttons installed to be moved inward and outward through the respective through-holes, said release buttons releasing the hook members from the locking slots.

21. The display connection structure of an electronic appliance as claimed in claim 19, with said second coupler comprising:
   a light-emitting array emitting light beams to be transmitted through said optical fiber bundle;
   a second holder supporting said light-emitting array on a leading end of said second holder accommodating said light-emitting array to be connected to the other end of said optical fiber bundle;
   a second body provided with through-holes supporting said second holder accommodating said second holder to move inward and outward;
   an elastic member installed in said second body elastically pressing said second holder outward;
   elastically deformable hook members installed in the second body so as to be hooked in locking slots formed on said light-receiving module when said second coupler is coupled to said light-receiving module; and
   release buttons installed to be moved inward and outward through the respective through-holes releasing said hook members from the locking slots.

22. A display connection structure of an electronic appliance, comprising:
   a main body;
   a display receiving an image signal from said main body and displaying an image;
   a connection unit including hinge pins rotatably installed on said main body, and housing provided on said display accommodating connection to said hinge pins and to pivot together with the hinge pins accommodating detachably connecting said display to said main body; and
   an optical connector having portions provided on said main body and said display to correspond to each other accommodating transmitting an image signal by light,
   with said display connection structure further comprising a pair of assembly-disassembly angle adjusting units restricting assembly or disassembly of the display accommodating said display to be connected to or disconnected from said main body only at a predetermined angle with respect to said main body.

23. The display connection structure of an electronic appliance as claimed in claim 22, with said assembly-disassembly angle adjusting unit comprising:
   a first adjustment portion restricting said assembly-disassembly angle between said hinge pin and said housing; and
   a second adjustment portion automatically returning said optical connector to a predetermined position to accommodate the position of the optical connector to be aligned with said assembly-disassembly angle adjusted by said first adjustment portion.

24. The display connection structure of an electronic appliance as claimed in claim 23, with said first adjustment portion including;
   an engagement pin formed to be projected from a side of said housing; and
   a cover member installed on said main body covering a portion of said hinge pin, said cover member having a guide groove provided at a side of said cover member to correspond to said engagement pin guiding said engagement pin at said assembly-disassembly angle, said cover member having an engagement groove formed to be continued from the guide groove preventing said engagement pin from being separated from the engagement groove at angles other than said assembly-disassembly angle.

25. The display connection structure of an electronic appliance as claimed in claim 23, with said second adjustment portion including:
   a support member installed on said main body, and having a first housing portion formed to be projected from a side of said support member to have a cylindrical shape and a predetermined radius, and a second housing portion formed to have a larger radius than said first housing portion by a predetermined distance so that stop jaws can be formed at boundaries with said first housing portion;
   a pivotable member having one end connected to said optical connector and an other end of said pivotable member being rotatably housed in said first housing portion, said pivotable member being provided with a support portion formed in a circumferential direction so as to be projected from an end surface of said support portion and to correspond to said first housing portion; and a pivot spring installed between said pivotable member and said support member, both ends of said pivot spring can be selectively supported by both end portions of said support portion and said stop jaws providing said pivotable member with a restoring force, said pivotable member being positioned by the elastic force of said pivot spring to be maintained at said assembly-disassembly angle.

26. The display connection structure of an electronic appliance as claimed in claim 25, with said second adjustment portion further including a compression spring installed between said pivotable member and said optical connector pressing said pivotable member toward said support member.

27. The display connection structure of an electronic appliance as claimed in claim 25, with said optical connection having an engagement hole formed at one side of said optical connection, one end of said pivotable member can be inserted into the engagement hole, and locking projections being formed to be projected from the inner side of the engagement hole preventing said optical connector from rotating with respect to said pivotable member; and locking slots being formed at the one end of said pivotable member inserted into the engagement hole to correspond to said locking projections.

28. A method, comprising the steps of:

forming a main body;

receiving an image signal from said main body by a display and displaying an image;

installing a connection unit including hinge pins rotatably on said main body, and housing provided on said display accommodating connection to said hinge pins and to pivot together with the hinge pins accommodating detachably connecting said display to said main body, said housing having a housing body having a front frame and a rear frame, and being secured to said display, said housing having a hinge bracket installed in said housing body, provided with engagement slots fitted to the hinge pins during connection of said display to said main body, said connection unit having supporting brackets secured to said main body supporting said hinge pins accommodating hinge pins to be exposed to the outside of said main body, said connection unit having a locking-unlocking unit accommodating locking said housing and said hinge pins together, or unlocking said housing and said hinge pins from each other; and providing an optical connector having portions on said main body and said display to correspond to each other accommodating transmitting an image signal by light, with said locking-unlocking unit comprising of:

installing a locking member movably within said housing to engage with or disengage from a locking groove formed on a head of said hinge pin;

biasing elastically said locking member with an elastic member toward the locking groove accommodating said locking member to be locked into the locking groove; and installing an unlocking lever to be projected and exposed to the outside of said housing through an elongated guide hole formed on said housing, and to be movable within the elongated guide hole.

29. The method of claim 28, further comprising the step of forming a sloped guide groove on said head of said hinge pin guiding a locking rod accommodating said locking rod to be engaged with the locking groove.

30. A method, comprising the steps of:

forming a main body;

receiving an image signal from said main body by a display and displaying an image;

installing a connection unit including hinge pins rotatably on said main body, and housing provided on said display accommodating connection to said hinge pins and to pivot together with the hinge pins accommodating detachably connecting said display to said main body, said housing having a housing body having a front frame and a rear frame, and being secured to said display, said housing having a hinge bracket installed in said housing body, provided with engagement slots fitted to the hinge pins during connection of said display to said main body, said connection unit having supporting brackets secured to said main body supporting said hinge pins accommodating hinge pins to be exposed to the outside of said main body, said connection unit having a locking-unlocking unit accommodating locking said housing and said hinge pins together, or unlocking said housing and said hinge pins from each other; and providing an optical connector having portions on said main body and said display to correspond to each other accommodating transmitting an image signal by light, with said optical connector comprising of:

installing a light-emitting module having a laser diode array, said laser diode array having each diode emitting light independently according to a driving signal, said light-emitting module being connected to a hinge pin, said light-emitting module pivoting together with said hinge pin; and installing a light-receiving module having a photodetector array, said photodetector array having each photodetector converting an incident light signal into an electrical signal independently, said light-receiving module being installed at said display to be coupled with the light-emitting module, said light-receiving module able to pivot together with said light-emitting module.

31. The method of claim 30, with said light-emitting module comprising of forming a first holder supported on said hinge pin, a recessed portion formed on an engagement surface of said first holder, said photodetector array being correspondingly inserted into said recessed portion, and said laser diode array being installed in said recessed portion to be exposed toward said light-receiving module.

32. The method of claim 31, with said light-receiving module comprising of:

installing a second holder supporting said photodetector array installed on a projected leading edge of said second holder;

installing abase on said display and providing with an opening supporting said second holder to be movable inward and outward; and installing an elastic member in said base elastically biasing said second holder outward accommodating said second holder to be projected to the outside of said base.

33. The method of claim 32, with said optical connector further comprising of forming a positioning unit guiding said light-receiving module accommodating said light-receiving module being able to be joined to said light-emitting module, and preventing unstable movement of said light-receiving module when said light-receiving module is joined to said light-emitting module.

34. The method of claim 33, with said positioning unit comprising of:
   forming a plurality of reference holes on the engagement surface of said light-emitting module in a first case, and said light-receiving module in a second case;
   installing guide pins on said light-receiving module if the reference holes are installed in said light-emitting module, and on said light-emitting module if the reference holes are installed on the light-receiving module, said guide pins to face the reference holes; and
   installing a pressing member elastically pressing against one side of said light-emitting module in a direction of an axis of said hinge pin.

35. The method of claim 34, with said positioning unit further comprising of installing a pair of first main electrodes to be elastically movable within two respective reference holes, and elastic members elastically pressing the respective first main electrodes outward; and said guide pins including a pair of second main electrodes made of a conductive material accommodating electrical connection to the respective first main electrodes and to electrically connect said display to a main power source of said main body when said display is connected to said main body.

36. The method of claim 35, with said display connection structure further comprising a switching unit electrically connecting or disconnecting said first main electrodes and said second main electrodes one by one during assembly or disassembly of said main body and said display.

37. The method of claim 36, with said switching unit comprising a pair of elastic switches provided in said light-emitting module to correspond to the respective first main electrodes, said elastic switches being positioned at different distances from said first main electrodes accommodating said first main electrodes being connected to or disconnected from said elastic switches one by one when said first main electrodes approach or are separated from said elastic switches; and when said light-emitting and light-receiving modules are separated from each other, said first main electrodes and said second main electrodes are separated from each other after said first main electrodes are separated from the respective elastic switches one by one.

38. The method of claim 30, with said light-emitting module comprising of:
   installing a first holder having a recessed portion on a leading end surface of said first holder, said photodetector array being inserted into said recessed portion when said light-receiving and light-emitting modules are connected to each other, said first holder supporting said laser diode array in said recessed portion accommodating said laser diode array to be exposed toward the outside;
   installing a first case pivotably on said main body supporting said first holder accommodating said first holder to be moved inward and outward and said recessed portion to face said light-receiving module; and
   installing an elastic member in said first case pressing said first holder toward the outside of said first case.

* * * * *